(12) United States Patent
Hinami et al.

(10) Patent No.: US 8,150,585 B2
(45) Date of Patent: Apr. 3, 2012

(54) CONTROL SYSTEM FOR AUTOMATIC TRANSMISSION

(75) Inventors: Takashige Hinami, Machida (JP); Osamu Sato, Fujisawa (JP)

(73) Assignee: JATCO Ltd, Fuji-shi (JP)

( * ) Notice: Subject to any disclaimer, the term of this patent is extended or adjusted under 35 U.S.C. 154(b) by 491 days.

(21) Appl. No.: 12/400,329

(22) Filed: Mar. 9, 2009

(65) Prior Publication Data
US 2009/0234547 A1    Sep. 17, 2009

(30) Foreign Application Priority Data

Mar. 12, 2008 (JP) .................................. 2008-062929

(51) Int. Cl.
*B60W 10/10* (2012.01)
*G06F 7/00* (2006.01)

(52) U.S. Cl. ............................... 701/51; 701/59; 477/34

(58) Field of Classification Search .................... 701/51, 701/52, 55, 59, 60, 61; 475/269; 477/50, 477/53, 143, 144, 152, 155, 34
See application file for complete search history.

(56) References Cited

U.S. PATENT DOCUMENTS

| | | | | |
|---|---|---|---|---|
| 5,251,509 A | * | 10/1993 | Pollack et al. | 475/127 |
| 5,662,551 A | * | 9/1997 | Kamada | 477/152 |
| 5,954,776 A | * | 9/1999 | Saito et al. | 701/51 |
| 5,976,057 A | * | 11/1999 | Mori | 477/150 |
| 6,584,394 B2 | | 6/2003 | Takatori et al. | |
| 6,684,144 B2 | * | 1/2004 | Sekii et al. | 701/51 |
| 6,962,552 B2 | * | 11/2005 | Sakamoto et al. | 477/155 |
| 6,997,843 B2 | * | 2/2006 | Saitou | 475/269 |
| 7,164,981 B2 | * | 1/2007 | Kim | 701/51 |
| 7,211,028 B2 | * | 5/2007 | Matsumura | 477/124 |
| 7,220,214 B2 | * | 5/2007 | Iwamoto et al. | 477/98 |
| 7,318,789 B2 | | 1/2008 | Saitou et al. | |
| 2008/0139361 A1 | * | 6/2008 | Miyake et al. | 477/65 |
| 2009/0248265 A1 | * | 10/2009 | Tabata et al. | 701/59 |
| 2009/0271081 A1 | * | 10/2009 | Watanabe et al. | 701/60 |

FOREIGN PATENT DOCUMENTS

JP    2002-276799 A    9/2002
JP    2005-282810 A    10/2005

* cited by examiner

*Primary Examiner* — Kevin Hurley
*Assistant Examiner* — Marc Scharich
(74) *Attorney, Agent, or Firm* — Foley and Lardner LLP

(57) ABSTRACT

A control system including a friction engagement element, a solenoid valve, an engagement pressure control valve and an electronic control unit, wherein a learning correction amount is divided into an initial learning amount that has no dependence upon an engagement pressure command value and a time-dependent deterioration amount that has dependence upon the engagement pressure command value, and wherein a time-dependent deterioration correction amount is determined according to the engagement pressure command value and a degree of progress of time-dependent deterioration that is indicated by a difference between a learning region correction amount and an initial learning amount which are obtained by a learning control in a learning region that is a limited input torque region, and a final engagement pressure command value is calculated as the learning correction amount by adding the initial learning amount at the time of correction to the time-dependent deterioration correction amount.

14 Claims, 10 Drawing Sheets

MAGNETIC CONTAMINANT C

CONTROL SYSTEM FOR AUTOMATIC TRANSMISSION

BACKGROUND OF THE INVENTION

The present invention relates to a control system for an automatic transmission which includes a solenoid valve for producing solenoid pressure in response to application of a solenoid current thereto, and performs learning control of engagement pressure to be applied to frictional engagement elements which are engaged and released upon shifting.

There have been conventionally proposed control systems for an automatic transmission. Japanese Patent Application First Publication No. 2005-282810 discloses a control system for an automatic transmission which performs learning control of an engagement pressure command value (such as clutch pressure command value and brake pressure command value) that is output until a torque phase is terminated upon the next shifting on the basis of a rate of change of the gear ratio in an inertia phase in order to suppress variation in acceleration of a vehicle from a torque phase to an initial stage of the previous inertia phase.

Japanese Patent Application First Publication No. 2002-276799 discloses a control system for an automatic transmission in which throttle opening TVO (engine load) is divided into a plurality of throttle opening regions and learning correction amounts corresponding to the respective throttle opening regions are set and stored in order to prevent excess or lack of the respective learning correction amounts depending on variation in throttle opening TVO. Upon the next shifting, an engagement pressure command value is corrected by using the learning correction amount corresponding to the throttle opening region which is set and stored at the current shifting stage.

SUMMARY OF THE INVENTION

However, in Japanese Patent Application First Publication No. 2005-282810 described above, a learning correction amount of the engagement pressure command value which is learned at a certain degree of throttle opening TVO (for instance, TVO=1/8) at the current shifting is used in correction of the engagement pressure command value upon the next shifting even when the degree of throttle opening TVO is other than the certain degree (1/8). There might occur a problem that the learning correction amount of the engagement pressure command value becomes extremely large or extremely small, so that a desired shifting operation cannot be achieved to thereby cause a shift shock due to the extremely large learning correction amount or a prolonged shifting due to the extremely small learning correction amount.

Specifically, a drop of the hydraulic pressure in the automatic transmission is caused due to adhesion of a magnetic contaminant to a magnetic attraction portion of the solenoid valve which is an example of the posterior deterioration of a control mechanism in the control system for an automatic transmission. An amount of the drop of the hydraulic pressure due to the adhesion of a magnetic contaminant is increased as the engagement pressure command value becomes large. Therefore, a correction amount of the engagement pressure command value learned in a region beyond the certain degree (1/8) of throttle opening TVO where the engagement pressure command value becomes large, tends to be excessively small. In contrast, a correction amount of the engagement pressure command value learned in a region below the certain degree (1/8) of throttle opening TVO where the engagement pressure command value becomes small, becomes excessively large.

In Japanese Patent Application First Publication No. 2002-276799 described above, it is necessary to provide a plurality of memory boxes in which the learning correction amounts corresponding to the respective throttle opening regions are stored. This causes an excessive increase in storage capacity of RAM that is used in the control software system.

The present invention was made in view of the above problems. An object of the present invention is to provide a control system for an automatic transmission which is capable of eliminating influence of the time-dependent deterioration that occurs in the control mechanism, by establishing a control software system that realizes a learning correction without necessitating an increased storage capacity and without causing an extreme increase or an extreme decrease in learning correction amount, and capable of attaining a desired shifting operation continuously for a long time.

In one aspect of the present invention, there is provided control system for an automatic transmission, comprising:
a friction engagement element that is engaged or released upon shifting;
a solenoid valve that produces a solenoid pressure by application of a solenoid current;
an engagement pressure control valve that receives the solenoid pressure as an operating signal pressure and controls an engagement pressure to be supplied to the friction engagement element according to the solenoid pressure;
a learning correction amount setting and storing means for setting and storing a learning correction amount that is obtained when shifting is experienced; and
an engagement pressure command value learning correction means for correcting an engagement pressure command value that is calculated according to a shifting transition state by using the learning correction amount,
wherein the learning correction amount is divided into an initial learning amount that has no dependence upon the engagement pressure command value and converges into a constant amount owing to individual variation, and a time-dependent deterioration amount that has dependence upon the engagement pressure command value and varies owing to posterior deterioration of a control mechanism,
wherein the learning correction amount setting and storing means sets and stores a learning region correction amount and an initial learning amount which are obtained by a learning control in a learning region that is a limited input torque region, and
wherein the engagement pressure command value learning correction means determines a time-dependent deterioration correction amount according to the engagement pressure command value and a degree of progress of time-dependent deterioration that is indicated by a difference between the learning region correction amount and the initial learning amount, and calculates a final engagement pressure command value as the learning correction amount by adding the initial learning amount at the time of correction to the time-dependent deterioration correction amount.

In a further aspect of the present invention, there is provided a control method for controlling an automatic transmission, the automatic transmission including a friction engagement element that is engaged or released upon shifting, a solenoid valve that produces a solenoid pressure by application of a solenoid current, an engagement pressure control valve that receives the solenoid pressure as an operating signal pressure and controls an engagement pressure to be supplied to the friction engagement element according to the solenoid pressure, and an electronic control unit for controlling the solenoid current which includes a learning correction amount setting and storing section for setting and storing a learning correction amount that is obtained when shifting is experienced and an engagement pressure command value learning correction section for correcting an engagement pressure command value that is calculated according to a shifting transition state by using the learning correction amount, wherein the learning correction amount is divided into an initial learning amount that has no dependence upon the engagement pressure command value and converges into a constant amount owing to individual variation, and a time-dependent deterioration amount that has dependence upon the engagement pressure command value and varies owing to posterior deterioration of a control mechanism, the control method comprising the steps of:

setting and storing a learning region correction amount and an initial learning amount which are obtained by a learning control in a learning region that is a limited input torque region;

determining a time-dependent deterioration correction amount according to the engagement pressure command value and a degree of progress of time-dependent deterioration that is indicated by a difference between the learning region correction amount and the initial learning amount; and calculating a final engagement pressure command value as the learning correction amount by adding the initial learning amount at the time of correction to the time-dependent deterioration correction amount.

DETAILED DESCRIPTION OF THE INVENTION

Figure 1:
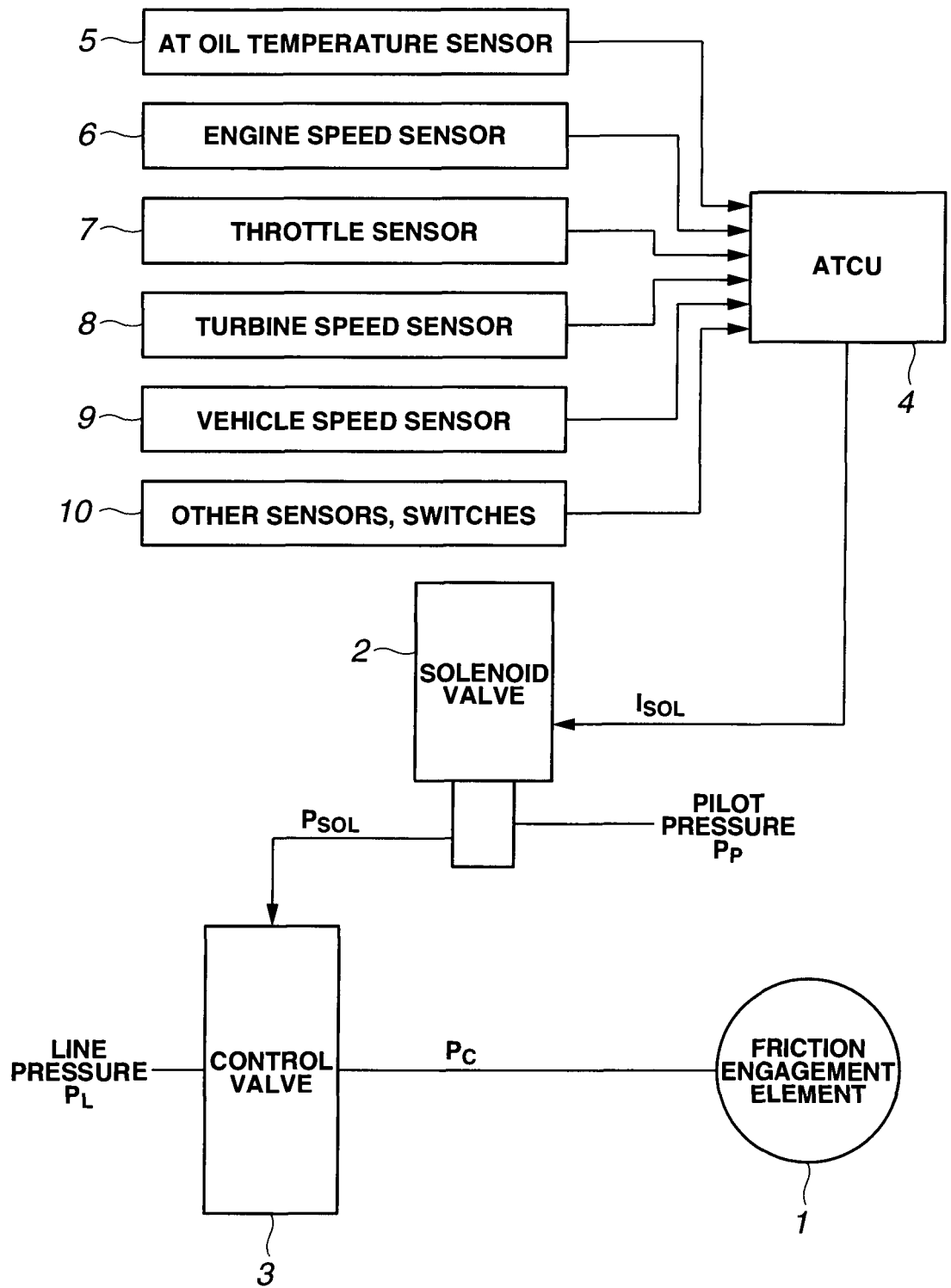
FIG. 1 is a schematic block diagram showing a whole control system for an automatic transmission installed in a vehicle with an engine, of an embodiment of the present invention.

With reference to the accompanying drawings, an embodiment of a control system for an automatic transmission installed in a vehicle with an engine, according to the present invention is explained. FIG. 1 is a schematic block diagram showing the control system of the embodiment which is applied to a shift control system.

As illustrated in FIG. 1, the control system of the embodiment includes friction engagement element 1, solenoid valve (specifically, normal-high linear solenoid valve) 2, control valve (specifically, engagement pressure control valve) 3 and automatic transmission electronic control unit (ATCU) 4.

Friction engagement element 1 is controlled to be engaged or released by engagement pressure Pc that is supplied from control valve 3 upon a transition of shifting. Friction engagement element 1 may be a hydraulic multiple disk clutch, a hydraulic multiple disk brake and the like.

Normal-high linear solenoid valve 2 receives pilot pressure Pp (a constant pressure) as source pressure which is produced by a pilot valve, not shown, and produces solenoid pressure $P_{SOL}$ that is applied to control valve 3, according to solenoid current $I_{SOL}$ (for instance, duty drive current of 800 Hz) that is controlled by ATCU 4 and applied to normal-high linear solenoid valve 2.

Control valve 3 is a regulator spool valve that receives solenoid pressure $P_{SOL}$ as an operating signal pressure from normal-high linear solenoid valve 2 and line pressure $P_L$ as source pressure from a line pressure control valve, not shown, and controls engagement pressure Pc that is applied to friction engagement element 1. Control valve 3 performs such hydraulic control that as solenoid pressure $P_{SOL}$ becomes higher, engagement pressure Pc is increased.

As shown in FIG. 1, ATCU 4 receives various signals from AT oil temperature sensor 5 as an oil temperature detection element, engine speed sensor 6, throttle sensor 7, turbine speed sensor 8, vehicle speed sensor 9 and other sensors and switches 10.

ATCU 4 performs such shift control that a shift start command is output when an operating point based on a throttle opening and a vehicle speed crosses an upshift line or a downshift line in a predetermined shift schedule (for instance, a seven forward speed shift schedule). Further, ATCU 4 performs calculation of an engagement pressure command value in shift transition in accordance with the shift start command and variation in gear ratio Gr that is determined by the turbine speed (i.e., AT input speed) and the vehicle speed (i.e., AT output speed).

Further, ATCU 4 performs learning correction amount setting and storing process (see FIG. 3) for setting and storing a learning correction amount that is obtained when the shifting is experienced, and engagement pressure command value learning correction process (see FIG. 4) for correcting an engagement pressure command value that is calculated according to a state of the shift transition, with the learning correction amount.

Figure 2:
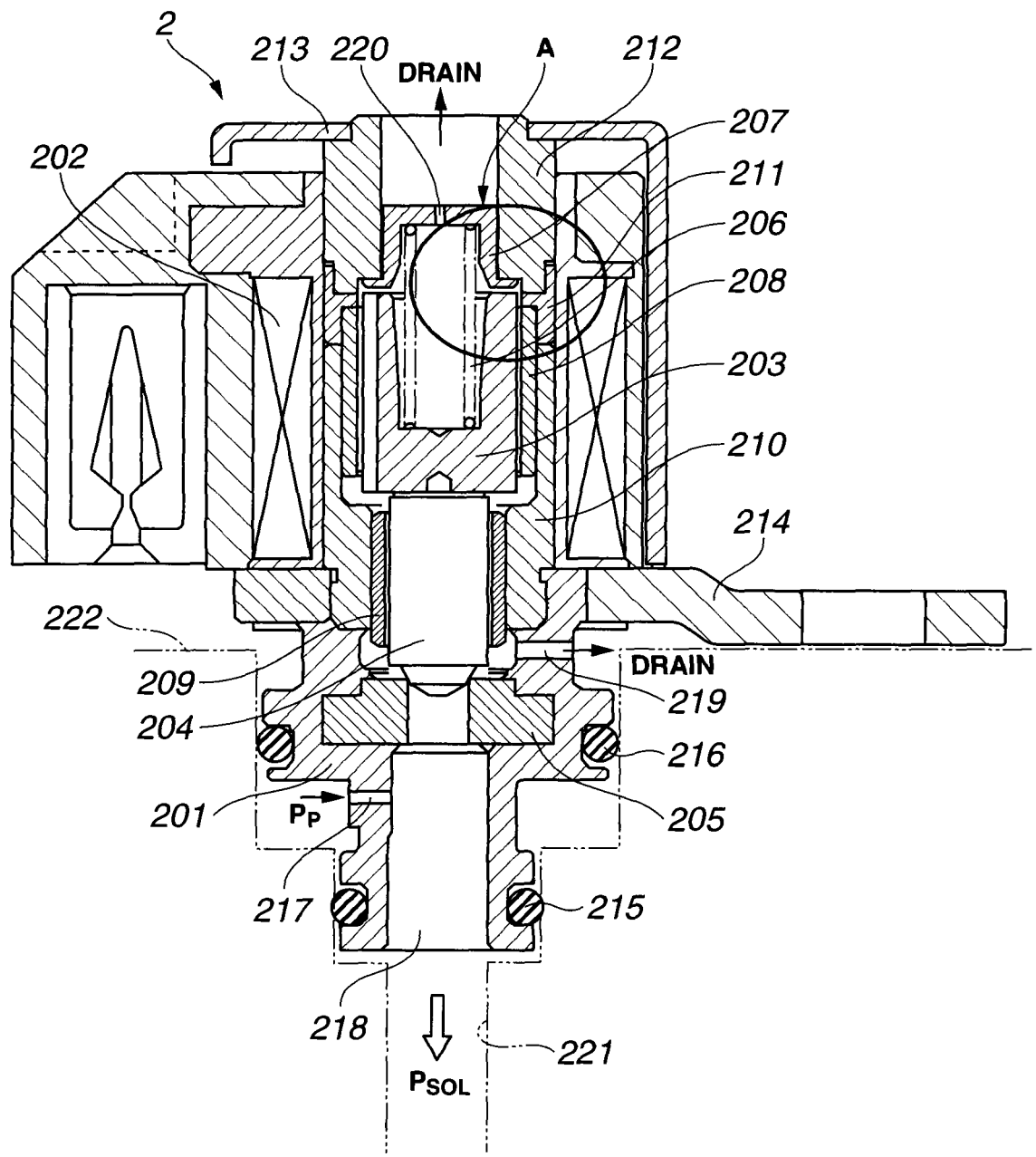
FIG. 2 is a cross-section of a normal-high linear solenoid valve as an example of a solenoid valve which is applied to the control system of the embodiment of the present invention.

FIG. 2 is a cross-section of normal-high linear solenoid valve 2 as one example of a solenoid valve that is applied to the control system of the embodiment.

As shown in FIG. 2, normal-high linear solenoid valve 2 includes valve housing 201, solenoid 202, plunger 203, valve body 204, valve seat 205, spring 206, shim 207, plunger bushing 208, valve body bushing 209, first bushing support frame 210, second bushing support frame 211, shim support frame 212, valve cover 213, mounting flange 214, first seal ring 215, second seal ring 216, pilot pressure port 217, solenoid pressure port 218, first drain port 219, and second drain port 220. Plunger bushing 208 and valve body bushing 209 may be made of a suitable plastic material such as PTFE.

Normal-high linear solenoid valve 2 is fixed to valve body 222 of a valve control unit that is formed with solenoid pressure oil passage 221, through mounting flange 214. When solenoid current $I_{SOL}$ that is applied to solenoid 202 is zero, normal-high linear solenoid valve 2 is placed in a closed position in which valve body 204 and valve seat 5 as a united body are in butt contact with each other by a biasing force of spring 206 which is exerted on plunger 203 and valve body 204 in a downward direction when viewed in FIG. 2. In the closed position of normal-high linear solenoid valve 2, no amount of a drain oil is discharged from first drain port 219 and second drain port 220, and pilot pressure Pp from pilot pressure port 217 is directly introduced into solenoid pressure port 218 so that solenoid pressure $P_{SOL}$ becomes the maximum value (normal high).

When solenoid current $I_{SOL}$ that is applied to solenoid 202 becomes large to generate a magnetic attraction force, plunger 203 and valve body 204 are urged by the magnetic attraction force so as to move upwardly when viewed in FIG. 2, against the biasing force of spring 206 to thereby separate valve body 204 from valve seat 205. As a result, normal-high linear solenoid valve 2 is brought into an open position. An opening degree of normal-high linear solenoid valve 2 is increased as the magnetic attraction force becomes larger. Due to the increase in the opening degree of normal-high linear solenoid valve 2, the drain oil amount that is discharged from first drain port 219 and second drain port 220 is increased, causing a drop of solenoid pressure $P_{SOL}$ from solenoid pressure port 218. That is, there exists an inverse proportional relationship between solenoid current $I_{SOL}$ input to normal-high linear solenoid valve 2 and solenoid pressure $P_{SOL}$ output from normal-high linear solenoid valve 2, in which as solenoid current $I_{SOL}$ is increased, solenoid pressure $P_{SOL}$ is reduced (see FIG. 11).

Figure 3:
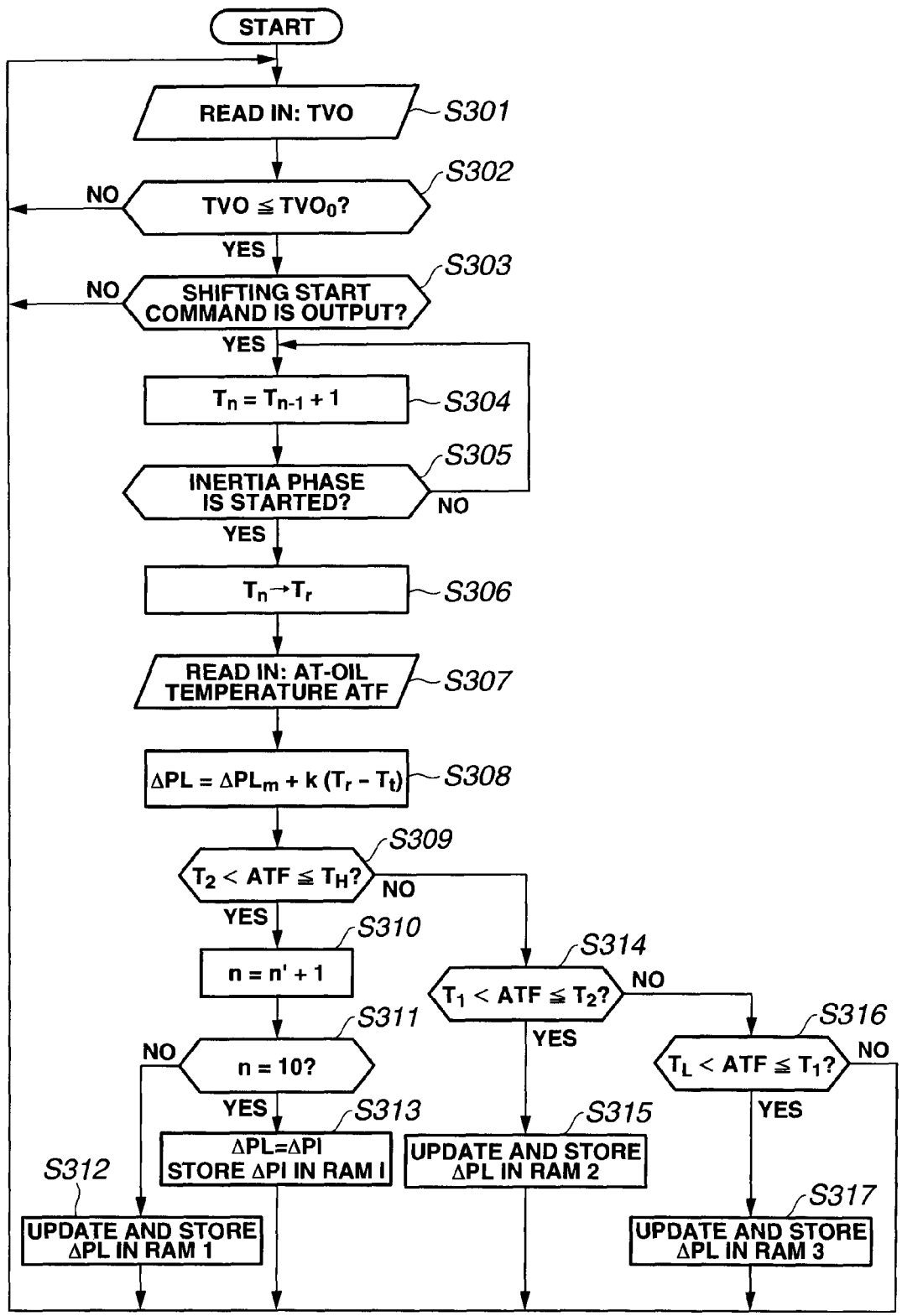
FIG. 3 is a flowchart showing a routine of a learning correction amount setting and storing process which is executed by an automatic transmission control unit in the control system of the embodiment.

FIG. 3 is a flowchart showing a routine of a learning correction amount setting and storing process which is executed by ATCU 4 in the control system of the embodiment. Referring to FIG. 3, the routine of the learning correction amount setting and storing process is explained.

In step S301, throttle opening TVO detected by throttle sensor 7 is read in. The routine goes to step S302.

In step S302, subsequent to the read-in of throttle opening TVO in step S301, it is judged whether or not throttle opening TVO is not more than a predetermined opening $TVO_o$ (for instance, ⅛) that indicates a low input torque region. When the answer to step S302 is YES (TVO≦$TVO_o$), the routine goes to step S303. When the answer to step S302 is NO (TVO>$TVO_o$), the routine returns to step S301.

In step S303, subsequent to the judgment of TVO≦$TVO_o$ in step S302, it is judged whether or not the shift start command is output in a shift control processing section of ATCU 4. When the answer to step S303 is YES indicating that the output of the shift start command is present, the routine goes to step S304. When the answer to step S303 is NO indicating that the output of the shift start command is absent, the routine returns to step S301.

In step S304, subsequent to the judgment of the presence of the output of the shift start command in step S303, current timer value $T_n$ is obtained by adding "1" to previous timer value $T_{n-1}$. The routine then goes to step S305. Meanwhile, an initial value of the timer value is zero.

In step S305, subsequent to the addition of "1" to previous timer value $T_{n-1}$ ($T_n=T_{n-1}+1$) in step S304, it is judged whether or not transition from the shift start to a standby phase and a torque phase is experienced and an inertia phase is started. When the answer to step S305 is YES indicating that the inertia phase is started, the routine goes to step S306. When the answer to step S305 is NO indicating that the inertia phase is not yet started, the routine returns to step S304. The judgment as to whether or not the inertia phase is started is conducted by monitoring gear ratio Gr and judging whether or not the change from the gear ratio Gr in the gear stage before shifting to the gear ratio Gr in the gear stage after shifting is started.

In step S306, subsequent to the judgment that the inertia phase is started in step S305, timer value $T_n$ that is measured until that time is rewritten to piston stroke time $T_r$ of a piston of friction engagement element 1. The routine then goes to step S307.

In step S307, subsequent to the rewrite to piston stroke time $T_r$ in step S306, AT oil temperature ATF detected by AT oil temperature sensor 5 is read in. The routine then goes to step S308.

In step S308, subsequent to the read-in of AT oil temperature ATF in step S307, piston stroke learning region correction amount ΔPL (hereinafter referred to as PS learning region correction amount ΔPL) is calculated by using the following formula.

$$\Delta PL = \Delta PL_m + k(T_r - T_t)$$

wherein $\Delta PL_m$ is a PS learning region correction amount already stored in a memory that stores PS learning region correction amount ΔPL in which the friction engagement element, shift mode and oil temperature range are identical to those in the current learning, k is a constant for determining a correction amount with respect to time difference, and $T_t$ is a target time of piston stroke time. The target time is determined as being a piston stroke time that can achieve high quality shifting causing no shock or prolongation, in accordance with AT oil temperature ATF. Further, an upper limit value and a lower limit value of PS learning region correction amount ΔPL are set for each of the friction engagement elements.

In step S309, subsequent to the calculation of PS learning region correction amount ΔPL in step S308, it is judged whether or not AT oil temperature ATF is in an ordinary temperature range that is beyond second switching oil temperature $T_2$ (for instance, 60° C.) and not more than high temperature side inhibit oil temperature $T_H$ (for instance, 120° C.) When the answer to step S309 is YES indicating that AT oil temperature ATF is in the ordinary temperature range, the routine goes to step S310. When the answer to step S309 is NO indicating that AT oil temperature ATF is out of the ordinary temperature range, the routine goes to step S314.

In step S310, subsequent to the judgment that AT oil temperature ATF is in the ordinary temperature range in step S309, current number of times n of learning (hereinafter referred to as learning frequency n) is calculated by adding 1 to previous learning frequency n'. The routine then goes to step S311.

In step S311, subsequent to the calculation of learning frequency n in step S310, it is judged whether or not learning frequency n is 10. When the answer to step S311 is YES indicating that learning frequency n is 10, the routine goes to step S313. When the answer to step S311 is NO indicating that learning frequency n is less than 10, the routine goes to step S312. The reason of the judgment as to whether or not learning frequency n is 10 is that if PS learning region correction is repeatedly experienced in the ordinary temperature range with the identical friction engagement element and shift mode, learning region correction amount ΔPL is converged to a stable value in which a difference between a previous value and a current value of PS learning region correction amount ΔPL becomes small.

In step S312, subsequent to the judgment that learning frequency n is less than 10 in step S311, PS learning region correction amount ΔPL calculated in step S308 is updated and stored in first memory RAM1. The routine then returns to step S301.

In step S313, subsequent to the judgment that learning frequency n is 10 in step S311, PS learning region correction amount ΔPL calculated in step S308 is set as piston stroke initial learning amount ΔPI (hereinafter referred to as PS initial learning amount ΔPI), and PS initial learning amount ΔPI is stored in initial learning amount memory RAMI. The routine then returns to step S301.

In step S314, subsequent to the judgment that AT oil temperature ATF is out of the ordinary temperature range in step S309, it is judged whether or not AT oil temperature ATF is in an intermediate temperature range that is beyond first switching oil temperature $T_1$ (for instance, 20° C.) and not more than second switching oil temperature $T_2$ (for instance, 60° C.) When the answer to step S314 is YES indicating that AT oil temperature ATF is in the intermediate temperature range, the routine goes to step S315. When the answer to step S314 is NO indicating that AT oil temperature ATF is out of the intermediate temperature range, the routine goes to step S316.

In step S315, subsequent to the judgment that AT oil temperature ATF is in the intermediate temperature range (i.e., $T_1<ATF\leq T_2$) in step S314, PS learning region correction amount ΔPL calculated in step S308 is updated and stored in second memory RAM2. The routine then returns to step S301.

In step S316, subsequent to the judgment that AT oil temperature ATF is out of the intermediate temperature range in step S314, it is judged whether or not AT oil temperature ATF is in a low temperature range that is beyond low temperature side inhibit oil temperature $T_L$ (for instance, 0° C.) and not more than first switching oil temperature $T_1$ (for instance, 20° C.). When the answer to step S316 is YES indicating that AT oil temperature ATF is in the low temperature range (i.e., $T_L<ATF\leq T_1$) in step S314, the routine goes to step S317. When the answer to step S316 is NO indicating that AT oil temperature ATF is out of the low temperature range in step S314, the routine returns to step S301.

In step S317, subsequent to the judgment that AT oil temperature ATF is in the low temperature range (i.e., $T_L<ATF\leq T_1$) in step S316, PS learning region correction amount ΔPL calculated in step S308 is updated and stored in third memory RAM3. The routine then returns to step S301.

Figure 4:
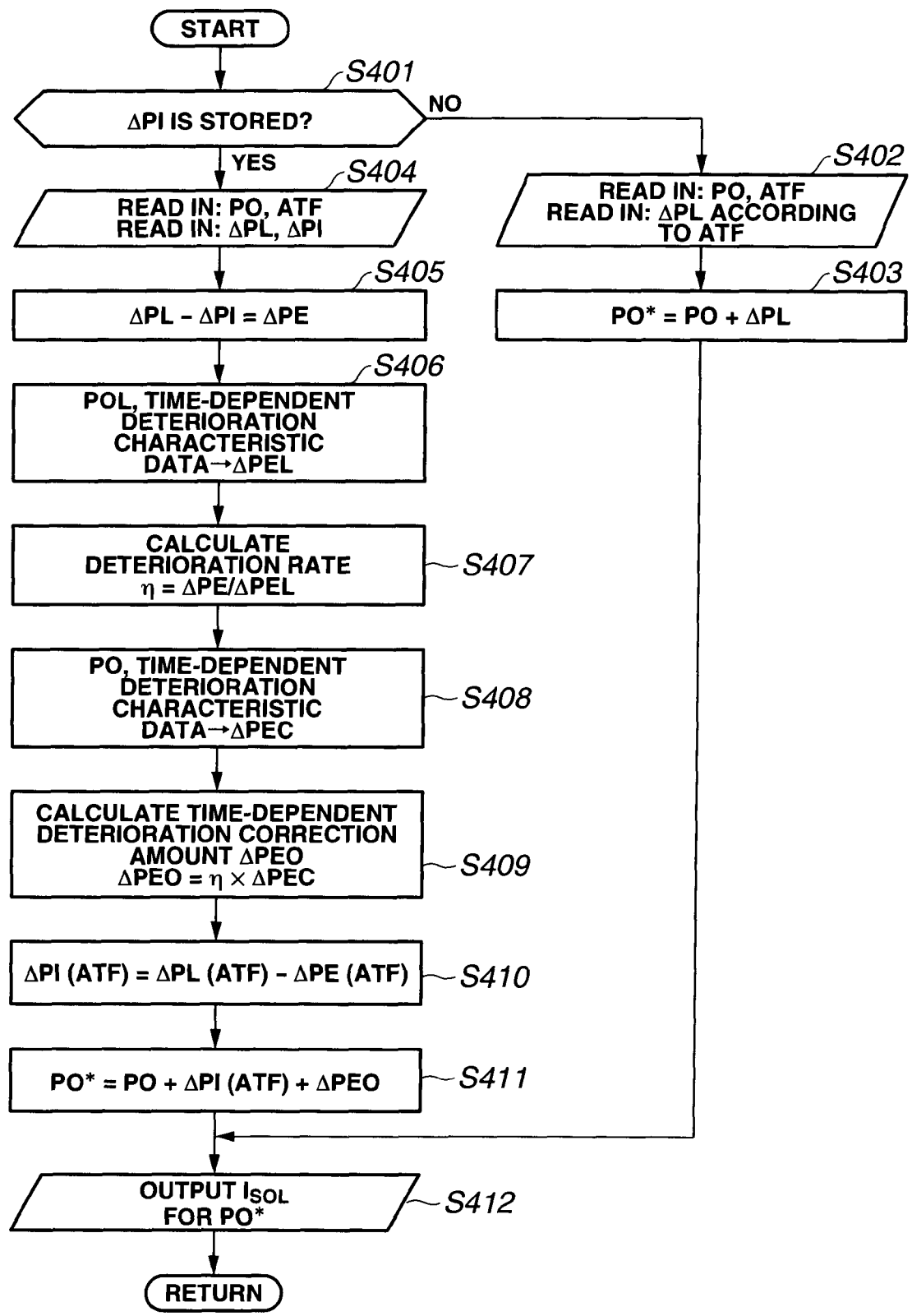
FIG. 4 is a flowchart showing a routine of an engagement pressure command value learning correction process which is executed by an automatic transmission control unit in the control system of the embodiment.

FIG. 4 is a flowchart showing a routine of learning correction of an engagement pressure command value which is executed by ATCU 4 in the control system of the embodiment. Referring to FIG. 4, the routine of the learning correction of the engagement pressure command value is explained.

The routine of the learning correction of the engagement pressure command value is executed over an entire hydraulic pressure region of the engagement pressure and an entire phase of the release pressure upon upshift control, downshift control and engagement control (N-D, N-R).

In step S401, it is judged whether or not PS initial learning amount ΔPI is stored. When the answer to step S401 is YES indicating that PS initial learning amount ΔPI is stored, the routine goes to step S404. When the answer to step S401 is NO indicating that PS initial learning amount ΔPI is not stored, the routine goes to step S402.

In step S402, subsequent to the judgment that PS initial learning amount ΔPI is not stored in step S401, engagement pressure command value PO (equivalent to clutch pressure command value) and AT oil temperature ATF are read in and PS learning region correction amount ΔPL according to AT oil temperature ATF is read in from one of three memories RAM1, RAM2 and RAM3. The routine then goes to step S403.

In step S403, subsequent to the read-in of engagement pressure command value PO, AT oil temperature ATF and PS learning region correction amount ΔPL according to AT oil temperature ATF in step S402, final engagement pressure command value PO* is calculated by adding PS learning region correction amount ΔPL to engagement pressure command value PO. The routine then goes to step S412.

In step S404, subsequent to the judgment that PS initial learning amount ΔPI is stored in step S401, engagement pressure command value PO and AT oil temperature ATF are read in, and PS learning region correction amount ΔPL based on AT oil temperature ATF and PS initial learning amount ΔPI are read in. The routine then goes to step S405.

In step S405, subsequent to the read-in of PS learning region correction amount ΔPL and PS initial learning amount ΔPI in step S404, learning region time-dependent deterioration amount ΔPE is calculated by subtracting PS initial learning amount ΔPI from PS learning region correction amount ΔPL. The routine then goes to step S406.

Figure 9:
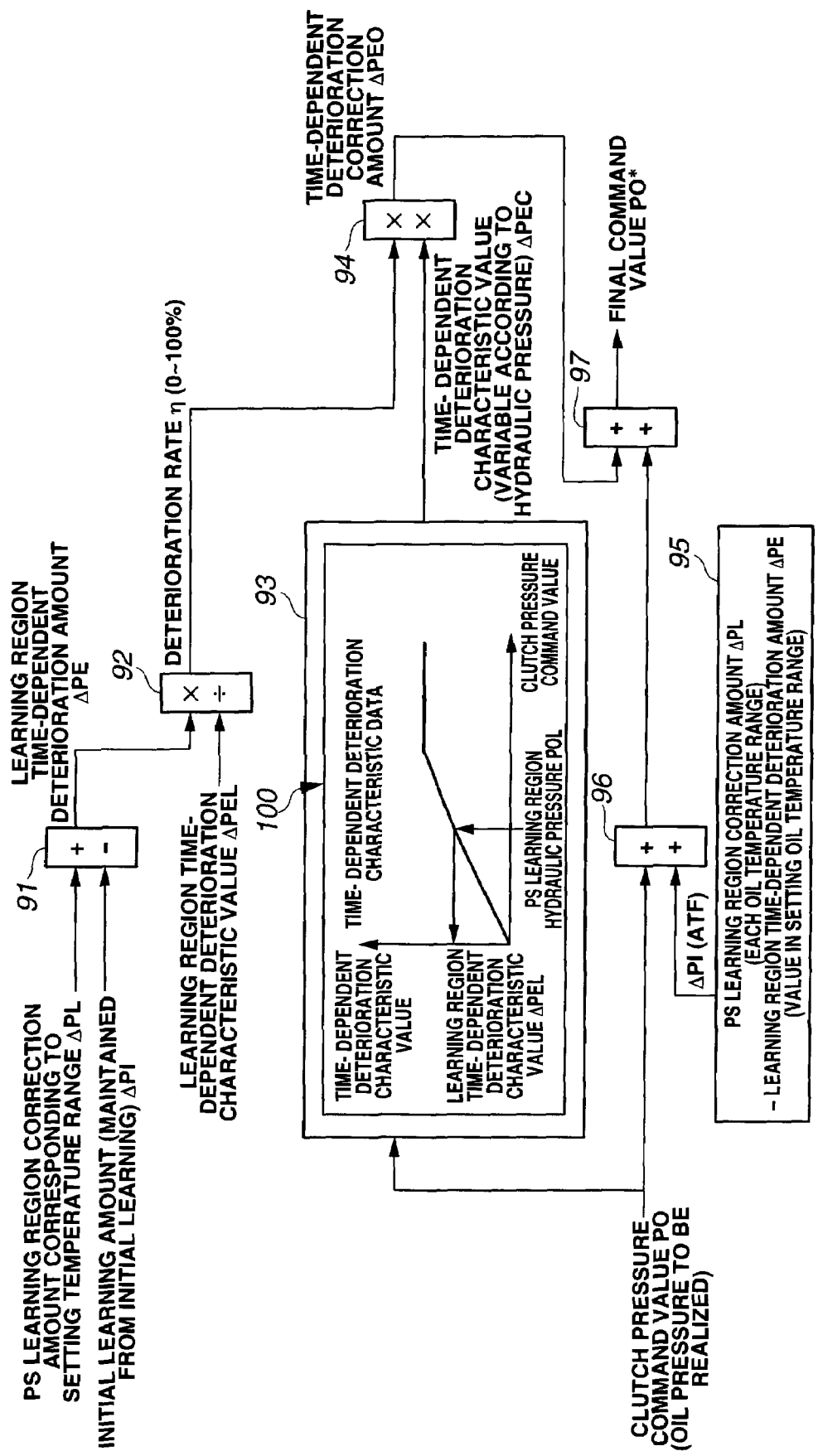
FIG. 9 is a block diagram showing an operation process to derive a final engagement pressure command value in the learning correction for eliminating influence of time-dependent deterioration in the control system of the embodiment.

In step S406, subsequent to the calculation of learning region time-dependent deterioration amount ΔPE in step S405, learning region time-dependent deterioration characteristic value ΔPEL corresponding to PS learning region engagement pressure command value POL (equivalent to PS learning region hydraulic pressure) is determined by using PS learning region engagement pressure command value POL and time-dependent deterioration characteristic data (see FIG. 9). The routine then goes to step S407.

In step S407, subsequent to the determination of learning region time-dependent deterioration characteristic value ΔPEL in step S406, deterioration rate η is calculated by dividing learning region time-dependent deterioration amount ΔPE by learning region time-dependent deterioration characteristic value ΔPEL. The routine then goes to step S408.

In step S408, subsequent to the calculation of deterioration rate η in step S407, time-dependent deterioration characteristic value ΔPEC corresponding to engagement pressure command value PO (equivalent to clutch pressure command value) is determined by using engagement pressure command value PO and time-dependent deterioration characteristic data (see FIG. 9). The routine then goes to step S409.

In step S409, subsequent to the determination of time-dependent deterioration characteristic value ΔPEC in step S408, time-dependent deterioration correction amount ΔPEO is calculated by multiplying deterioration rate η by time-dependent deterioration characteristic value ΔPEC. The routine then goes to step S410.

In step S410, subsequent to the calculation of time-dependent deterioration correction amount ΔPEO in step S409, oil temperature-dependent PS initial learning amount ΔPI(ATF) is calculated by subtracting learning region time-dependent deterioration amount in a setting oil temperature range ΔPE (ATF) from PS learning region correction amount in each oil temperature range ΔPL(ATF). The routine then goes to step S411.

In step S411, subsequent to the calculation of oil temperature-dependent PS initial learning amount ΔPI(ATF) in step S410, final engagement pressure command value PO* is calculated by adding oil temperature-dependent PS initial learning amount ΔPI(ATF) and time-dependent deterioration correction amount ΔPEO calculated in step S409 to engagement pressure command value PO. The routine then goes to step S412.

In step S412, subsequent to the calculation of final engagement pressure command value PO* in step S403 or step S411, solenoid current $I_{SOL}$ for final engagement pressure command value PO* is output. The routine then goes to RETURN. If final engagement pressure command value PO* is determined, solenoid current $I_{SOL}$ can be determined by using a map that shows a relationship between a preset engagement pressure command value and solenoid current.

Next, a mechanism of drop in hydraulic pressure due to solenoid internal contaminant, and a function of the control system of this embodiment are explained.

[Mechanism of Drop in Hydraulic Pressure Due to Solenoid Internal Contaminant]

Figure 5A:
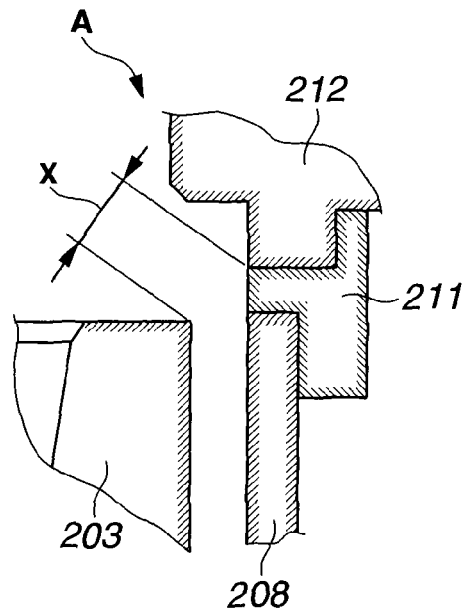
FIG. 5A is an enlarged view of a magnetic attraction portion of a normal-high linear solenoid valve that is applicable to the control system of the embodiment, and shows no contaminant adhered to the magnetic attraction portion and a magnetic gap at the magnetic attraction portion.
Figure 5B:
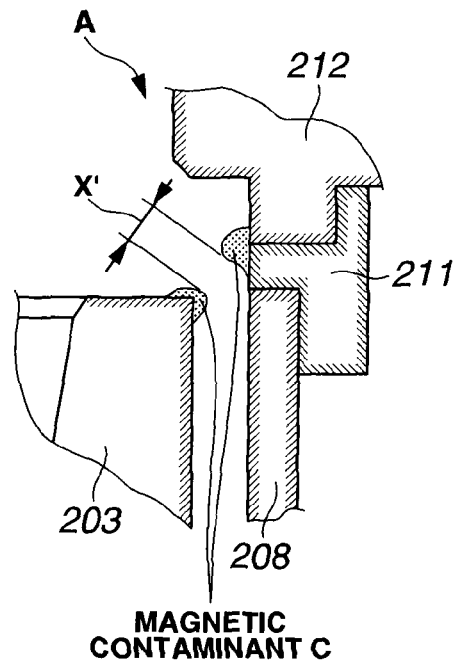
FIG. 5B is an enlarged view of a magnetic attraction portion of a normal-high linear solenoid valve that is applicable to the control system of the embodiment, and shows a contaminant adhered to the magnetic attraction portion and a magnetic gap at the magnetic attraction portion.
Figure 6:
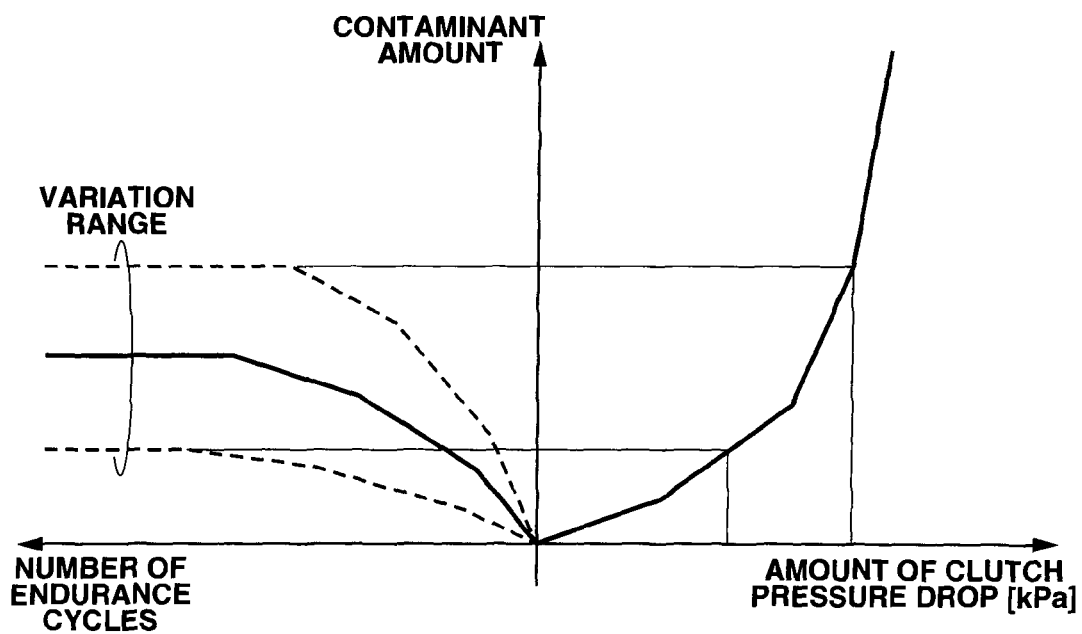
FIG. 6 is a diagram showing a relationship between a number of endurance cycles of a normal-high linear solenoid valve applicable to the control system of the embodiment and an amount of the contaminant adhered to the magnetic attraction portion of the normal-high linear solenoid valve, and a relationship between the amount of the contaminant adhered to the magnetic attraction portion and an amount of drop in clutch pressure.

FIG. 5A is an enlarged view of magnetic attraction portion A of normal-high linear solenoid valve 2 that is applied to the control system of this embodiment, which shows magnetic gap X when normal-high linear solenoid valve 2 is new and free from adhesion of magnetic contaminant. FIG. 5B is an enlarged view of magnetic attraction portion A of normal-high linear solenoid valve 2 that is applied to the control system of this embodiment, which shows magnetic gap X' when normal-high linear solenoid valve 2 suffers from adhesion of magnetic contaminant C. FIG. 6 is a diagram showing a relationship between a number of endurance cycles of normal-high linear solenoid valve 2 that is applied to the control system of this embodiment and an amount of the contaminant adhered to magnetic attraction portion A of normal-high linear solenoid valve 2, and a relationship between the amount of the contaminant adhered to magnetic attraction portion A and an amount of drop in clutch pressure.

First, in the course of an endurance test of an automatic transmission, solenoid pressure $P_{SOL}$ output from normal-high linear solenoid valve 2 was reduced and it was recognized that there occurred a drop in hydraulic pressure for friction engagement element 1 (a multiple disk clutch, a multiple disk brake and the like) that is controlled in engagement pressure by solenoid pressure $P_{SOL}$ as an operating signal pressure.

By checking the cause of reduction in solenoid pressure $P_{SOL}$, it was found that the contaminant entered into an interior of normal-high linear solenoid valve 2 and the contaminant is adhered to attraction portion A (see FIG. 2) at which a magnetic flux is concentrated.

According to an analysis made by the inventors of the present invention, the mechanism of drop in hydraulic pressure in friction engagement element 1 functioned according to the following processes.

(1) Contaminant enters the interior of normal-high linear solenoid valve 2 and magnetic contaminant C is adhered to attraction portion A.
(2) Magnetic gap at attraction portion A becomes small.
(3) Magnetic attraction force is increased.
(4) Hydraulic pressure that is supplied to friction engagement element 1 is reduced.

The reason that the contaminant enters the interior of normal-high linear solenoid valve 2 is that a part of drain oil containing magnetic contaminant C reaches attraction portion A through a clearance between valve body 204 and valve body bushing 209 and a clearance between plunger 203 and plunger bushing 208.

The reason that magnetic contaminant C is adhered to attraction portion A is as follows. At attraction portion A, the gap between magnetic metal materials, that is, at a boundary portion between a corner portion of plunger 203, second bushing support frame 211 and shim support frame 212, is kept narrow. Therefore, a strong magnetic attraction force acts between the two portions opposed to each other at attraction portion A to thereby cause adhesion of magnetic contaminant C contained in the drain oil to the opposed portions as shown in FIG. 5B.

The reason why the magnetic gap becomes small is that an amount of magnetic contaminant C adhered to attraction portion A is increased. As shown in FIG. 5A, magnetic gap X is certainly provided at attraction portion A of new normal-high linear solenoid valve 2. In contrast, as shown in FIG. 5B, magnetic gap X' at attraction portion A of normal-high linear solenoid valve 2 with adhesion of magnetic contaminant C is smaller than magnetic gap X shown in FIG. 5A. That is, as the amount of magnetic contaminant C is increased, magnetic gap X' becomes smaller.

The reason why magnetic attraction force F is increased along with decrease in magnetic gap X is as follows. Magnetic attraction force F is represented by the following formula.

$$F = (\mu_0 \cdot Ai \cdot I^2 \cdot N^2)/(2 \cdot X^2)$$

wherein $\mu_0$ is permeability, Ai is magnetic path area, I is electric current, and N is number of coil turns. As be apparent from the above formula, if the magnetic gap is decreased as indicated by X→X' as shown in FIG. 5A and FIG. 5B, a value of denominator becomes small even when a value of numerator is not varied, thereby causing increase in magnetic attraction force F.

The reason why the friction engagement pressure (equivalent to the clutch pressure) is reduced when magnetic attraction force F is increased, is as follows. Owing to increase in magnetic attraction force F, when solenoid current $I_{SOL}$ having the same magnitude is applied to normal-high linear solenoid valve 2, the valve opening of normal-high linear solenoid valve 2 becomes large to thereby cause decrease in magnitude of solenoid pressure $P_{SOL}$. This results in reduction of the hydraulic pressure for friction engagement element 1 which is produced by solenoid pressure $P_{SOL}$ as the operating signal pressure. That is, as shown in the relationship between the amount of the contaminant adhered to magnetic attraction portion A and the amount of drop in clutch pressure in FIG. 6, it is apparently understood that the amount of the clutch pressure drop is varied with a large gradient within a variation range of the contaminant amount. In contrast, the gradient of the drop in clutch pressure becomes smaller toward zero in a lower region out of the variation range of the contaminant amount. Further, as shown in FIG. 6, the correlation between the number of endurance cycles and the contaminant amount is small, and the contaminant amount levels off when the number of endurance cycles exceeds a predetermined value.

[Setting and Storing of Learning Correction Amount]

Figure 7:
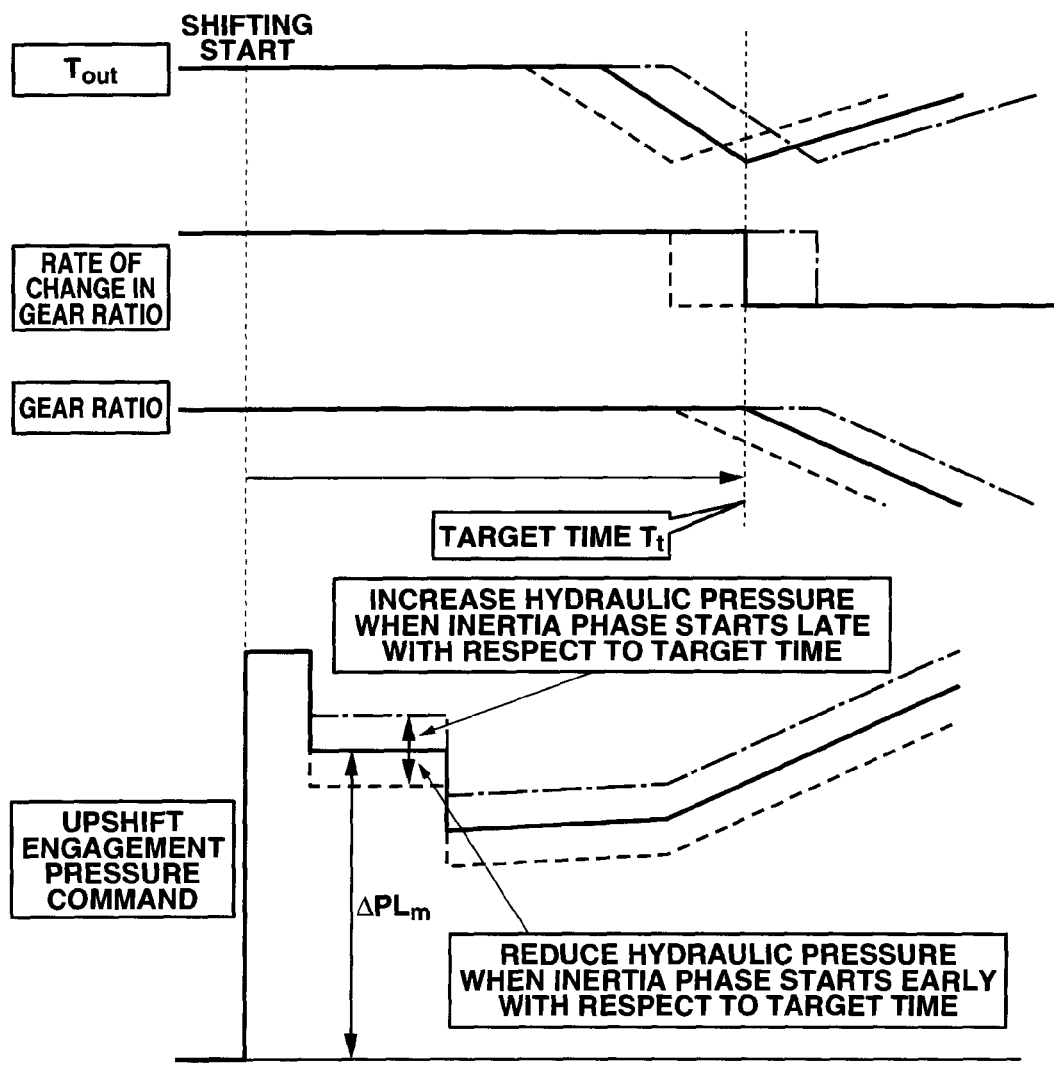
FIG. 7 is a time chart showing output torque, rate of change in gear ratio, gear ratio and upshift engagement pressure command during an upshift transition (as an example of a shift transition) for the sake of explanation of hydraulic pressure correction by piston stroke learning which is performed in the control system of the embodiment.
Figure 8:
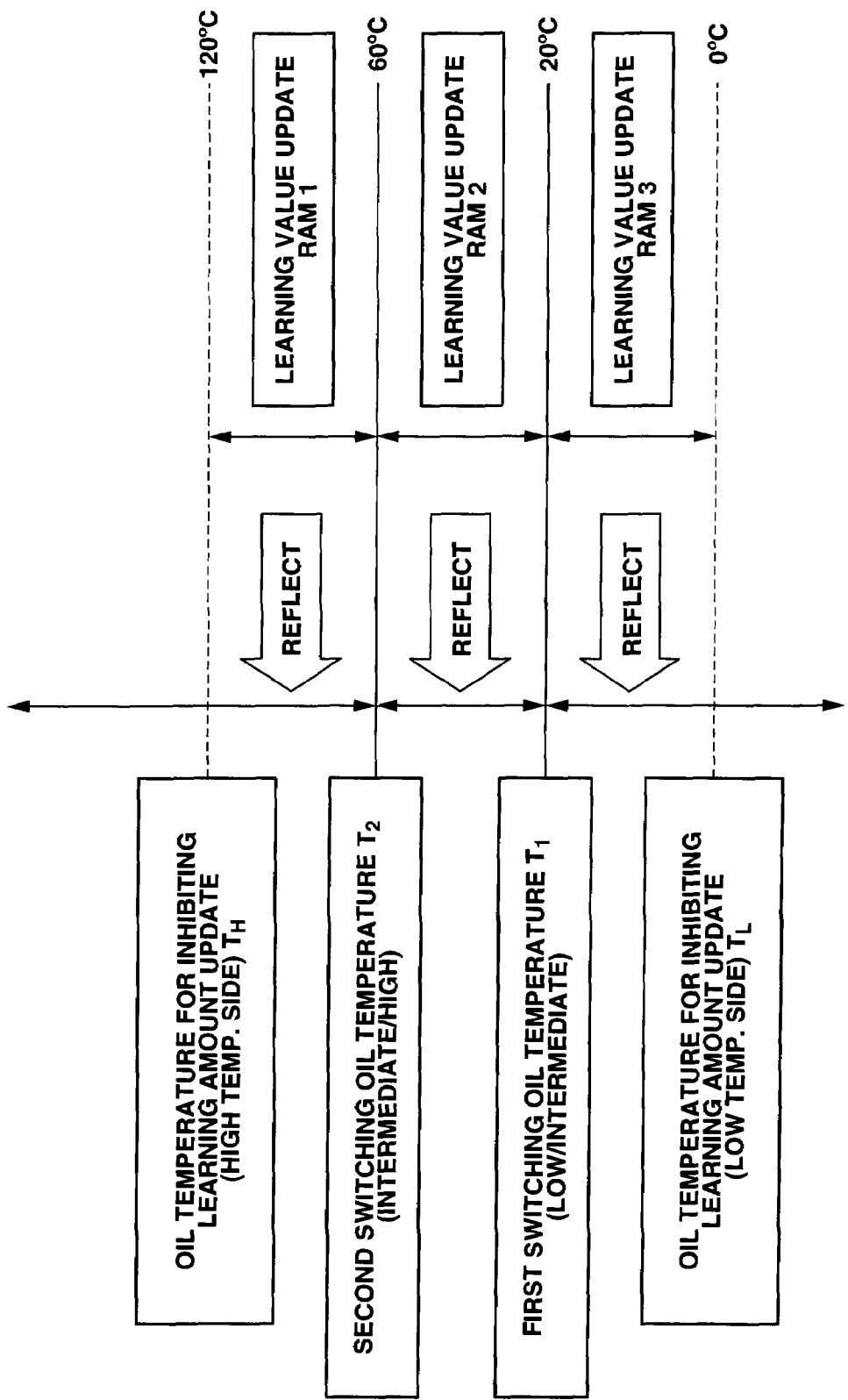
FIG. 8 is a diagram showing a relationship between oil temperatures in the automatic transmission, correction values in learning regions, and updating and reflection in the control system of the embodiment.

FIG. 7 is a time chart showing output torque, rate of change in gear ratio, gear ratio and upshift engagement pressure command during an upshift transition (as an example of a shift transition) for the sake of explanation of hydraulic pressure correction by piston stroke learning which is performed in the control system for an automatic transmission according to this embodiment. FIG. 8 is a diagram showing a relationship between AT oil temperatures, correction values in learning regions, and updating and reflection in the control system for an automatic transmission according to this embodiment.

When the throttle opening condition of $(TVO \leq TVO_0)$ and the shifting start command output condition are satisfied during running of the vehicle, the routine of learning correction amount storing and setting starts from step S301 and proceeds to steps S302, S303, S304 and S305 as shown in FIG. 3. The routine proceeding to steps S304 and S305 is repeatedly implemented until it is judged that the inertia phase is started in step S305. When it is judged that the inertia phase is started in step S305, the routine proceeds to steps S306, S307 and S308. In step S306, timer value $T_n$ that is measured until that time is rewritten to piston stroke time $T_r$. In step S308, PS learning region correction amount $\Delta PL$ is calculated by using the formula $\Delta PL = \Delta PL_m + k(T_r - T_t)$.

That is, when start of the inertia phase is retarded with respect to target time $T_t$ (i.e., $T_r > T_t$), already stored PS learning region correction amount $\Delta PL_m$ indicated by solid-line characteristic in FIG. 7 is increased by an amount of $k(T_r - T_t)$ and varied as indicated by chain line in FIG. 7 such that piston stroke time $T_r$ approaches target time $T_t$ as closely as possible at the time of next upshift.

On the other hand, when start of the inertia phase occurs earlier with respect to target time $T_t$ (i.e., $T_r < T_t$) already stored PS learning region correction amount $\Delta PL_m$ indicated by solid-line characteristic in FIG. 7 is decreased by an amount of $k(T_r - T_t)$ and varied as indicated by dotted line in FIG. 7 such that piston stroke time $T_r$ approaches target time $T_t$ as closely as possible at the time of next upshift.

Further, when AT oil temperature ATF is in the ordinary temperature range that is beyond second switching oil temperature $T_2$ (for instance, 60° C.) and not more than high temperature side inhibit oil temperature $T_H$ (for instance, 120° C.), the routine proceeds to step S312 through steps S308, S309, S310 and S311 as shown in FIG. 3. In step S312, PS learning region correction amount $\Delta PL$ calculated in step S308 is updated and stored in first memory RAM1.

Further, when learning frequency "n" reaches 10 through the learning experience under a condition that AT oil temperature ATF is in the ordinary temperature range, the routine proceeds to step S313 through steps S308, S309, S310 and S311 as shown in FIG. 3. In step S313, PS learning region correction amount $\Delta PL$ calculated in step S308 is set as PS initial learning amount $\Delta PI$, and PS initial learning amount $\Delta PI$ is stored in initial learning amount memory RAMI. Once the time PS initial learning amount $\Delta PI$ is stored, PS initial learning amount $\Delta PI$ is subsequently maintained in initial learning amount memory RAMI.

On the other hand, when AT oil temperature ATF is in the intermediate temperature range that is beyond first switching oil temperature $T_1$ (for instance, 20° C.) and not more than second switching oil temperature $T_2$ (for instance, 60° C.), the routine proceeds to step S315 through steps S308, S309 and S314 as shown in FIG. 3. In step S315, PS learning region correction amount $\Delta PL$ calculated in step S308 is updated and stored in second memory RAM2.

When AT oil temperature ATF is in the low temperature range that is beyond low temperature side inhibit oil temperature $T_L$ (for instance, 0° C.) and not more than first switching oil temperature $T_1$ (for instance, 20° C.), the routine proceeds to step S317 through steps S308, S309, S314 and S316 as shown in FIG. 3. In step S317, PS learning region correction amount $\Delta PL$ calculated in step S308 is updated and stored in third memory RAM3.

As explained above, the piston stroke learning correction method is adopted as a learning correction method for correcting variation in hydraulic pressure for each of friction engagement elements 1. Accordingly, it is possible to control the piston stroke time (shift time) of friction engagement element 1 for a time period which is elapsed from the shifting start to the inertia phase start. As a result, it is possible to perform learning correction that can attain both suppression of a feeling of prolonged shifting and reduction of a shift shock.

Further, storing and setting the learning correction amount is performed in the low input torque region (0 to 150 Nm) in which throttle opening TVO is in the range of 0 to 1/8. For instance, in the high input torque region, an actual hydraulic pressure level becomes high and influence of variation in hydraulic pressure on the shift time becomes small to thereby lower a learning sensitivity. In contrast, by performing the piston stroke learning only in the low input torque region, the actual hydraulic pressure level becomes low and the influence of variation in hydraulic pressure on the shift time becomes large to thereby attain an increased learning sensitivity. In other words, it is possible to perform the learning correction with high sensitivity to occurrence of variation in hydraulic pressure.

FIG. 8 shows a data construction of PS learning region correction amount $\Delta PL$. In the data construction, an AT oil temperature range is divided into three ranges including the ordinary temperature range (high temperature range), the intermediate temperature range and the low temperature range for each friction engagement element 1, and there are provided first memory RAM1 corresponding to the ordinary temperature range, second memory RAM2 corresponding to the intermediate temperature range and third memory RAM3 corresponding to the low temperature range. PS learning region correction amount $\Delta PL$ is updated in first memory RAM1, second memory RAM2 and third memory RAM3 in the range of 0° C. to 120° C. Accordingly, when viewed with respect to not an axis of the AT oil temperature but an axis of the throttle opening, the data construction of PS learning region correction amount $\Delta PL$ simply has one memory in the throttle opening region of 0 to 1/8 which serves as the PS learning region. Therefore, the storage capacity can be considerably reduced as compared to a case where a throttle opening region is divided into a large number of throttle opening regions and the learning correction amount is stored in the respective throttle opening regions. Further, when viewed with respect to the axis of the AT oil temperature, the data construction of PS learning region correction amount ΔPL includes the three AT oil temperature ranges shown in FIG. 8, PS learning region correction amount ΔPL in third memory RAM3 is used to reflect the learning in a temperature range lower than 0° C., and PS learning region correction amount ΔPL in first memory RAM1 is used to reflect the learning in a temperature range higher than 120° C. Accordingly, with the provision of only the three memories including first memory RAM1, second memory RAM2 and third memory RAM3, the data of PS learning region correction amount ΔPL on which the AT oil temperature in every temperature range is reflected can be obtained. In addition, in a data construction of PS initial learning amount ΔPI, PS initial learning amount ΔPI is not stored for each AT oil temperature range but stored in only one initial learning amount memory RAMI. Accordingly, the RAM storage capacity can be reduced regardless of addition of initial learning amount memory RAMI.

[Learning Correction of Engagement Pressure Command Value Before Setting PS Initial Learning Amount]

Until PS initial learning amount ΔPI is set, the routine proceeding to steps S401, S402, S403 and S412 as shown in FIG. 4 is repeatedly implemented. In step S403, final engagement pressure command value PO* is calculated by adding PS learning region correction amount ΔPL to engagement pressure command value PO. In step S412, solenoid current $I_{SOL}$ for final engagement pressure command value PO* is output.

The learning correction of the engagement pressure command value according to the present invention is featured in that PS learning region correction amount ΔPL is divided into PS initial learning amount ΔPI that has no dependence upon engagement pressure command value PO and converges to a constant amount owing to individual variation, and a time-dependent deterioration amount that has dependence upon engagement pressure command value PO and varies owing to posterior deterioration of a control mechanism (adhesion of magnetic contaminant, variation in friction coefficient of a friction plate, and the like).

That is, since the learning correction of engagement pressure command value PO is performed on the premise that PS initial learning amount ΔPI is set, it is possible to omit implementation of the learning correction before setting PS initial learning amount ΔPI. However, in this case, declination in shift quality must be experienced before PS initial learning amount ΔPI is set.

In contrast, in an initial stage of the shift experience, there occurs almost no time-dependent deterioration and PS learning region correction amount ΔPL becomes substantially equal to PS initial learning amount ΔPI independent of engagement pressure command value PO. For this reason, the learning correction is performed such that final engagement pressure command value PO* is obtained using the formula PO*=PO+ΔPL.

Accordingly, during a time period from the initial stage of the shift experience until PS initial learning amount ΔPI is set, good shift quality can be ensured by performing the learning correction that prevents a shift shock and a prolonged shift feeling which are caused due to individual variation, and the learning correction can be followed by the subsequent learning correction that eliminates influence of the time-dependent deterioration on the premise that PS initial learning amount ΔPI is set.

[Learning Correction of Engagement Pressure Command Value After Setting PS Initial Learning Amount]

Figure 10:
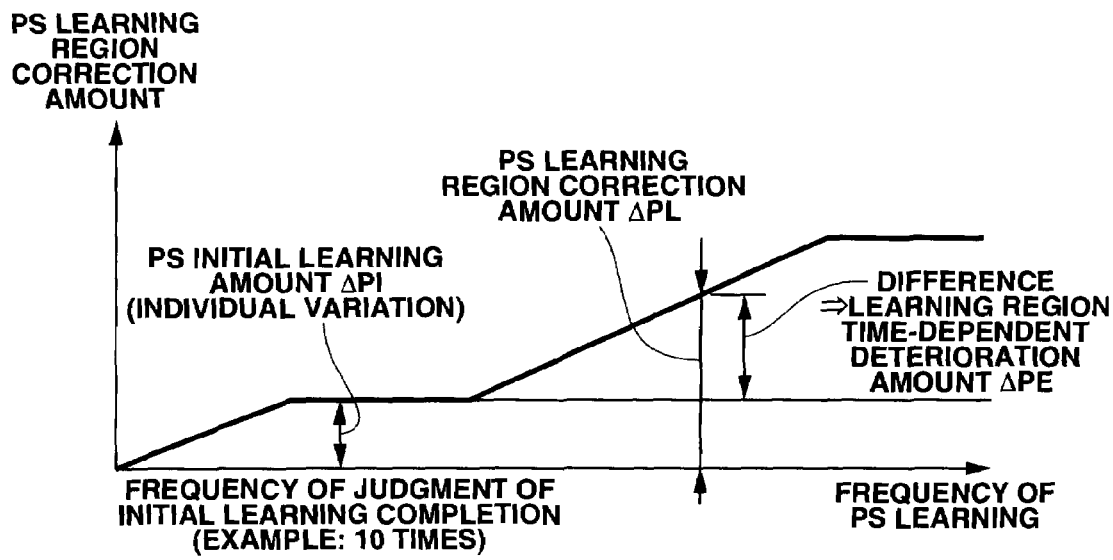
FIG. 10 is a diagram showing a relationship between frequency of PS learning and PS learning region correction amount that is obtained as a sum of a PS initial learning amount and a learning region time-dependent deterioration amount.
Figure 11:
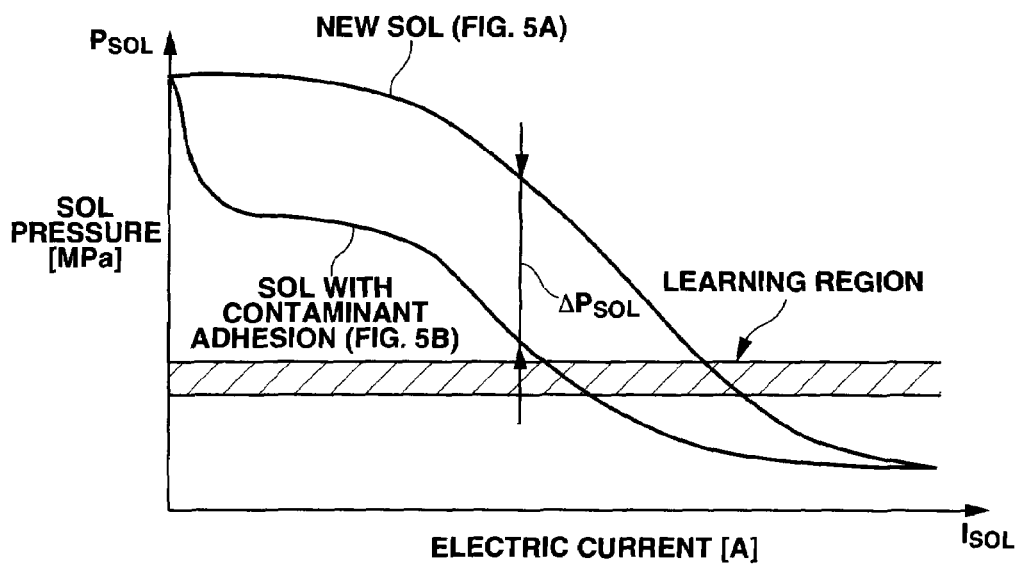
FIG. 11 is a diagram showing an input and output characteristic curve of a new normal-high linear solenoid valve in the control system of the embodiment which has no contaminant adhesion, and an input and output characteristic curve of a used normal-high linear solenoid valve in the control system of the embodiment which has contaminant adhesion.
Figure 12:
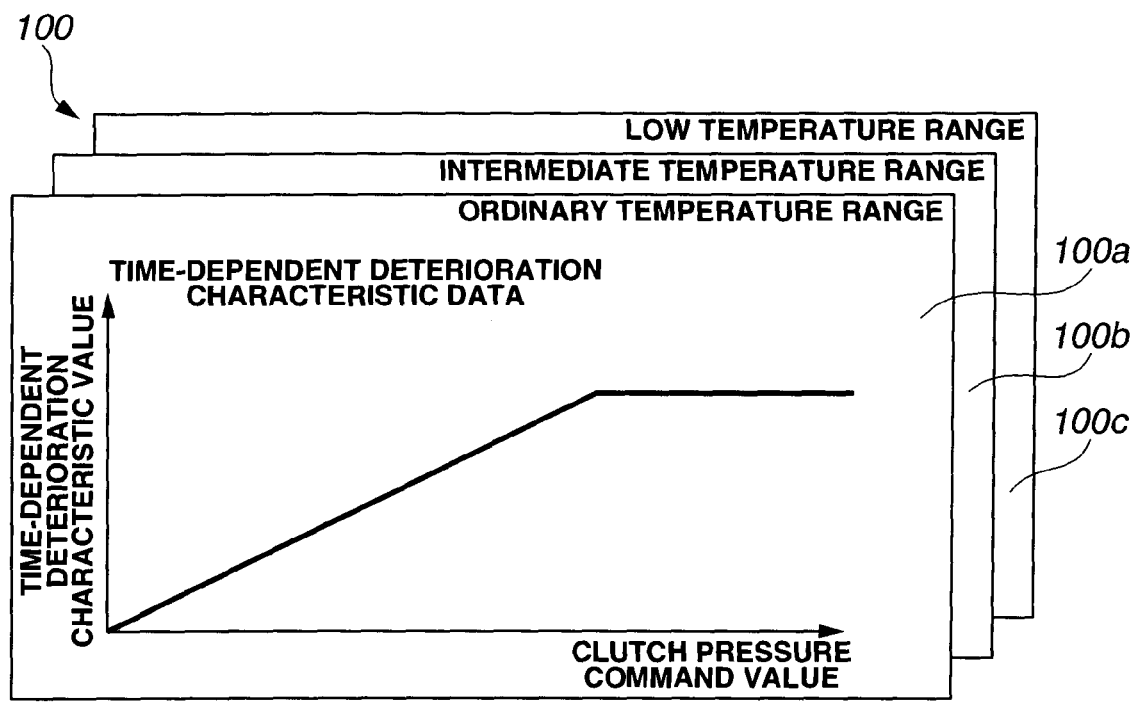
FIG. 12 is a diagram showing a time-dependent deterioration data that is preliminarily set and stored in an engagement pressure command value learning correction section of the control system of the embodiment.

FIG. 9 is a block diagram showing an operation process to attain final engagement pressure command value PO* in the learning correction for eliminating influence of time-dependent deterioration in the control system for an automatic transmission according to this embodiment. FIG. 10 is a diagram showing a relationship between frequency of the PS learning and the PS learning region correction amount that is obtained as a sum of the PS initial learning amount and the learning region time-dependent deterioration amount. FIG. 11 is a diagram showing an input and output characteristic curve of the normal-high linear solenoid valve in the control system for an automatic transmission according to this embodiment which is a new one with no contaminant adhesion, and an input and output characteristic curve of the normal-high linear solenoid valve in the control system for an automatic transmission according to this embodiment which is a used one with contaminant adhesion. FIG. 12 is a diagram showing a time-dependent deterioration data that is preliminarily set and stored in an engagement pressure command value learning correction section of the control system for an automatic transmission according to this embodiment.

(Calculation of Deterioration Rate)

When PS initial learning amount ΔPI is set, the routine proceeds from S401 to S404, S405, S406 and S407 as shown in FIG. 4. In step S407, deterioration rate η is calculated.

Specifically, in step S405, learning region time-dependent deterioration amount ΔPE is calculated by subtracting PS initial learning amount ΔPI that is successively maintained from the time of the initial learning, from PS learning region correction amount ΔPL in the setting temperature region corresponding to AT oil temperature ATF. The calculation of learning region time-dependent deterioration amount ΔPE is performed in learning region time-dependent deterioration amount calculating block 91 shown in FIG. 9. That is, in FIG. 10, information on learning region time-dependent deterioration amount ΔPE indicating a time-dependent deterioration amount that actually occurs in the learning region is obtained by attaining a difference between PS learning region correction amount ΔPL and PS initial learning amount ΔPI.

In next step S406, learning region time-dependent deterioration characteristic value ΔPEL corresponding to PS learning region engagement pressure command value POL (equivalent to PS learning region hydraulic pressure) is determined by using PS learning region engagement pressure command value POL and ordinary temperature range time-dependent deterioration characteristic data 100a (see FIG. 12) of time-dependent deterioration characteristic data 100. That is, information on learning region time-dependent deterioration characteristic value ΔPEL that indicates a maximum time-dependent deterioration amount in the learning region, is obtained.

In next step S407, deterioration rate η is calculated by dividing learning region time-dependent deterioration amount ΔPE by learning region time-dependent deterioration characteristic value ΔPEL. The calculation of deterioration rate η is performed in deterioration rate calculating block 92 shown in FIG. 9. Deterioration rate η that indicates a degree of progress of deterioration is a value independent of a magnitude of engagement command value PO, and therefore, deterioration rate η is calculated by using only the information on the learning region.

(Calculation of Time-Dependent Deterioration Correction Amount)

When deterioration rate η is calculated in step S407, the routine proceeds to step S408 and step S409 as shown in FIG. 4 to calculate time-dependent deterioration correction amount ΔPEO.

Specifically, in step S408, time-dependent deterioration characteristic value ΔPEC corresponding to engagement pressure command value PO (equivalent to clutch pressure command value) at the time of correction is determined by using engagement pressure command value PO and time-dependent deterioration characteristic data 100 shown in FIG. 9 which corresponds to the AT oil temperature range at the time of correction. The determination of time-dependent deterioration characteristic value ΔPEC is performed in time-dependent deterioration characteristic value calculating block 93 shown in FIG. 9. That is, information on time-dependent deterioration characteristic value ΔPEC that indicates a maximum time-dependent deterioration amount corresponding to engagement pressure command value PO in the AT oil temperature range at the time of correction, is obtained.

In next step S409, time-dependent deterioration correction amount ΔPEO is calculated by multiplying the previously calculated deterioration rate η by time-dependent deterioration characteristic value ΔPEC determined in step S408. The calculation of time-dependent deterioration correction amount ΔPEO is performed in time-dependent deterioration correction amount calculating block 94 shown in FIG. 9. That is, since an actual time-dependent deterioration amount is varied according to AT oil temperature ATF and engagement pressure command value PO, a correction amount corresponding to variation in the actual time-dependent deterioration amount is calculated as time-dependent deterioration correction amount ΔPEO.

(Calculation of PS Initial Learning Amount Corresponding to Oil Temperature)

When time-dependent deterioration correction amount ΔPEO is calculated in step S409, the routine proceeds to step S410 shown in FIG. 4 in which oil temperature-dependent PS initial learning ΔPI(ATF) is calculated.

Specifically, in step S410, oil temperature-dependent PS initial learning amount ΔPI(ATF) is calculated by subtracting the learning region time-dependent deterioration amount in a setting oil temperature range ΔPE(ATF) from the PS learning region correction amount in each AT oil temperature range ΔPL(ATF). The calculation of oil temperature-dependent PS initial learning amount ΔPI(ATF) is performed in oil temperature-dependent PS initial learning amount calculating block 95 shown in FIG. 9. In this embodiment, since PS initial learning amount ΔPI is set only in the ordinary oil temperature range, a data of PS initial learning amount ΔPI has no characteristic dependent upon AT oil temperature ATF. Therefore, information on oil temperature-dependent PS initial learning amount ΔPI(ATF) is obtained by the subtraction operation using time-dependent deterioration characteristic data 100 that corresponds to the AT oil temperature range at the time of correction, without increasing the RAM capacity.

(Calculation of Final Engagement Pressure Command Value)

When oil temperature-dependent PS initial learning amount ΔPI(ATF) is calculated in step S410, the routine proceeds to step S411 shown in FIG. 4, in which final engagement pressure command value PO* is calculated.

Specifically, in step S411, final engagement pressure command value PO* is calculated by adding oil temperature-dependent PS initial learning amount ΔPI(ATF) to engagement pressure command value PO in first addition block 96 shown in FIG. 9, and adding time-dependent deterioration correction amount ΔPEO calculated in time-dependent deterioration correction amount calculating block 94 to a sum (PO+ΔPI(ATF)) of engagement pressure command value PO and oil temperature-dependent PS initial learning amount ΔPI(ATF) in second addition block 97 shown in FIG. 9. That is, a variable value that is obtained by adding time-dependent deterioration correction amount ΔPEO based on AT oil temperature ATF and engagement pressure command value PO to oil temperature-dependent PS initial learning amount ΔPI (ATF), is determined as the learning correction amount. The routine then proceeds to step S412 in which solenoid current $I_{SOL}$ for obtaining final engagement pressure command value PO* is output.

(Addition of Concept of PS Initial Learning Amount)

As shown in FIG. 10, in the process of the engagement pressure command value learning correction, PS learning region correction amount ΔPL is divided into PS initial learning amount ΔPI that has no dependence upon the engagement pressure command value and converges into a constant amount owing to individual variation, and a time-dependent deterioration amount that has dependence upon engagement pressure command value PO and varies owing to posterior deterioration of the control mechanism. That is, a new technical concept of PS initial learning amount ΔPI is added so that the time-dependent deterioration amount having dependence upon engagement pressure command value PO is derived or taken out from PS learning region correction amount ΔPL as the total correction amount.

(Addition of Time-Dependent Deterioration Characteristic Data)

In addition, as a result of deriving or taking out the time-dependent deterioration amount dependent upon engagement pressure command value PO from PS learning region correction amount ΔPL, there is additionally provided the time-dependent deterioration characteristic data indicating a relationship between engagement pressure command value PO and the time-dependent deterioration characteristic value that indicates a maximum time-dependent deterioration amount with respect to engagement pressure command value PO (that is, a maximum value of hydraulic drop with respect to engagement pressure command value PO) owing to the posterior deterioration of the control mechanism.

In this embodiment, there is provided the time-dependent deterioration characteristic data that specializes the time-dependent deterioration due to adhesion of magnetic contaminant C to the solenoid valve among various causes of the posterior deterioration of the control mechanism. Specifically, as explained above, when magnetic contaminant C is adhered to attraction portion A of normal-high linear solenoid valve 2, magnetic gap X at attraction portion A is gradually decreased to thereby cause drop of solenoid pressure $P_{SOL}$ relative to solenoid current $I_{SOL}$.

As shown in FIG. 11 indicating the input and output characteristic curve of normal-high linear solenoid valve 2 in the new state without adhesion of magnetic contaminant C and the input and output characteristic curve of normal-high linear solenoid valve 2 in the used state with adhesion of a maximum amount of magnetic contaminant C, there occurs a constant solenoid differential pressure $\Delta P_{SOL}$ in a range in which solenoid current $I_{SOL}$ is low (i.e., in a range in which the clutch pressure command value is large). In the range in which solenoid current $I_{SOL}$ is not less than a setting current (that is, in the range in which the clutch pressure command value is small), as solenoid current $I_{SOL}$ becomes larger, solenoid differential pressure $\Delta P_{SOL}$ is proportionally decreased.

The engagement pressure command value learning correction section (a time-dependent deterioration characteristic data setting section) of the control system of this embodiment sets a maximum drop characteristic as time-dependent deterioration characteristic data 100 shown in FIG. 12, in which the time-dependent deterioration characteristic value is varied in proportion to engagement pressure command value PO (equivalent to the clutch pressure command value) in a region in which engagement pressure command value PO is not more than a predetermined value, and the time-dependent deterioration characteristic value is constant in a region in which engagement pressure command value PO is more than the predetermined value, on the basis of the characteristic of solenoid differential pressure $\Delta P_{SOL}$ as shown in FIG. 11. Time-dependent deterioration characteristic data 100 varies depending upon AT oil temperature ATF and, therefore, includes ordinary temperature range time-dependent deterioration characteristic data 100a, intermediate temperature range time-dependent deterioration characteristic data 100b and low temperature range time-dependent deterioration characteristic data 100c as shown in FIG. 12 which are set on the basis of AT oil temperature ATF and correspond to the stored data construction of the learning correction amount.

As explained above, in the engagement pressure command value learning correction of the control system of this embodiment, PS learning region correction amount $\Delta PL$ is divided into PS initial learning amount $\Delta PI$ that is independent of engagement pressure command value PO, and the time-dependent deterioration amount that is dependent on engagement pressure command value PO. From the time-dependent deterioration amount, time-dependent deterioration correction amount $\Delta PEO$ is determined according to deterioration rate $\eta$ (equivalent to a degree of progress of the time-dependent deterioration) and engagement pressure command value PO. Accordingly, even when engagement pressure command value PO is varied and expands over a region except for the learning region in which learning region engagement pressure command value POL should be attained, the learning correction amount which is obtained by adding time-dependent deterioration correction amount $\Delta PEO$ to oil temperature-dependent PS initial learning amount $\Delta PI(ATF)$ becomes an appropriate amount that reflects deterioration rate $\eta$, variation in engagement pressure command value PO, and variation in AT oil temperature ATF. As a result, there occurs no excess or no lack in the learning correction amount.

In particular, in this embodiment, the engagement pressure command value learning correction section sets the time-dependent deterioration characteristic data corresponding to the time-dependent deterioration that is caused due to adhesion of magnetic contaminant C to attraction portion A of normal-high linear solenoid valve 2. In general, even when various attempts to suppress the adhesion of magnetic contaminant C in the control mechanism are made, the adhesion of magnetic contaminant C cannot be completely eliminated and influence of the time-dependent deterioration still occurs. In contrast, in this embodiment, the influence of the time-dependent deterioration due to the adhesion of magnetic contaminant C can be effectively eliminated by measures made in the control software system. As a result, the shift operation with high quality which is required for the automatic transmission can be continuously attained over a long time.

This embodiment of the present invention can perform the following effects.

(1) The control system for an automatic transmission according to this embodiment includes friction engagement element 1 engageable or releasable upon shifting, the solenoid valve (i.e., normal-high linear solenoid valve 2) which produces solenoid pressure $P_{SOL}$ by application of solenoid current $I_{SOL}$, the engagement pressure control valve (i.e., control valve 3) which receives solenoid pressure $P_{SOL}$ as an operating signal pressure and controls engagement pressure $P_c$ to be supplied to friction engagement element 1 according to solenoid pressure $P_{SOL}$, the learning correction amount setting and storing means (FIG. 3) for setting and storing the learning correction amount that is obtained when shifting is experienced, and the engagement pressure command value learning correction means (FIG. 4) for correcting engagement pressure command value PO that is calculated according to a shifting transition state by using the learning correction amount, wherein the learning correction amount is divided into an initial learning amount that has no dependence upon engagement pressure command value PO and converges into a constant amount owing to individual variation, and a time-dependent deterioration amount that has dependence upon engagement pressure command value PO and varies owing to posterior deterioration of a control mechanism. The learning correction amount setting and storing means (FIG. 3) sets and stores a learning region correction amount (PS learning region correction amount $\Delta PL$) and an initial learning amount (PS initial learning amount $\Delta PI$) which are obtained by a learning control in a learning region that is a limited input torque region. The engagement pressure command value learning correction means (FIG. 4) determines a time-dependent deterioration correction amount $\Delta PEO$ according to engagement pressure command value PO and a degree of progress of time-dependent deterioration (deterioration rate $\eta$) that is indicated by a difference (learning region time-dependent deterioration amount $\Delta PE$) between the learning region correction amount (PS learning region correction amount $\Delta PL$) and the initial learning amount (PS initial learning amount $\Delta PI$), and calculates final engagement pressure command value PO* as the learning correction amount by adding the initial learning amount (PS initial learning amount $\Delta PI$) to the time-dependent deterioration correction amount $\Delta PEO$. According to the control system for an automatic transmission according to this embodiment, there is provided a control software system that realizes the learning correction capable of not only saving storage capacity but also preventing an excess or a lack of the learning correction amount. As a result, it is possible to eliminate influence of the time-dependent deterioration that occurs in the control mechanism, and achieve a desired shift operation continuously over a long time.

(2) The engagement pressure command value learning correction means (FIG. 4) has a time-dependent deterioration characteristic data that indicates a relationship between engagement pressure command value PO and a time-dependent deterioration characteristic value that indicates a maximum hydraulic drop value with respect to engagement pressure command value PO due to the posterior deterioration of the control mechanism. The engagement pressure command value learning correction means determines learning region time-dependent deterioration amount $\Delta PE$ by subtracting the initial learning amount (PS initial learning amount $\Delta PI$) from learning region correction amount $\Delta PL$ stored in the learning correction amount setting and storing means (FIG. 3), as shown in step S405 in FIG. 4. The engagement pressure command value learning correction means further determines learning region time-dependent deterioration characteristic value $\Delta PEL$ by using the time-dependent deterioration characteristic data and learning region engagement pressure $\Delta POL$, as shown in step S406 in FIG. 4. The engagement pressure command value learning correction means then calculates deterioration rate η that indicates the degree of progress of the time-dependent deterioration, by dividing learning region time-dependent deterioration amount ΔPE by learning region time-dependent deterioration characteristic value ΔPEL as shown in step S407 in FIG. 4. The engagement pressure command value learning correction means determines time-dependent deterioration characteristic value ΔPEC by using engagement pressure command value PO and the time-dependent deterioration characteristic data as shown in step S408 in FIG. 4. Further, the engagement pressure command value learning correction means then determines time-dependent deterioration correction amount ΔPEO by multiplying deterioration rate η by time-dependent deterioration characteristic value ΔPEC as shown in step S409 in FIG. 4. Since the engagement pressure command value learning correction means has the time-dependent deterioration characteristic data consistent with the posterior time-dependent deterioration that occurs in the control mechanism, it is possible to not only reduce influence of various types of the posterior time-dependent deterioration but also obtain time-dependent deterioration correction amount ΔPEO with high accuracy which corresponds to the progress of the time-dependent deterioration and realizes recovery from the time-dependent deterioration.

(3) The engagement pressure command value learning correction means (FIG. 4) sets a maximum drop characteristic as time-dependent deterioration characteristic data 100 in which time-dependent deterioration characteristic value ΔPEC varies in proportion to engagement pressure command value PO in a region in which engagement pressure command value PO is not more than a predetermined value, and time-dependent deterioration characteristic value ΔPEC is constant in a region in which engagement pressure command value PO is more than the predetermined value, on the basis of a characteristic of solenoid pressure $P_{SOL}$ which is dropped with respect to solenoid current $I_{SOL}$ due to gradual reduction of magnetic gap X at magnetic attraction portion A of the solenoid valve (normal-high linear solenoid valve 2) which is caused by magnetic contaminant C adhered to magnetic attraction portion A of the solenoid valve. Accordingly, it is possible to eliminate influence of the time-dependent deterioration due to the adhesion of magnetic contaminant C to magnetic attraction portion A of the solenoid valve and obtain time-dependent deterioration correction amount ΔPEO with high accuracy even in the case of increase and decrease in adhesion of magnetic contaminant C, and falling-off of magnetic contaminant C.

(4) The learning correction amount setting and storing means (FIG. 3) updates and stores a correction amount as PS learning region correction amount ΔPL which is increased when the shifting is conducted in a low input torque region in which throttle opening TVO is not more than setting degree $TVO_0$ and piston stroke time $T_r$ of friction engagement element 1 from start of the shifting to start of an inertia phase is longer than target time $T_t$, and decreased when the shifting is conducted in the low input torque region and piston stroke time $T_r$ is shorter than target time $T_t$. Accordingly, the piston stroke learning is conducted only in the low hydraulic pressure and low input torque region in which variation in hydraulic pressure has large influence on the shift time and a learning sensitivity is high. As a result, it is possible to determine PS learning region correction amount ΔPL as the learning correction data for obtaining high learning sensitivity and appropriately achieving high quality of the shift operation.

(5) The learning correction amount setting and storing means (FIG. 3) sets and stores a value of PS learning region correction amount ΔPL which is stabilized by experiencing a predetermined frequency of learning from start of the learning, as PS initial learning amount ΔPI, and successively maintains PS initial learning amount ΔPI once PS initial learning amount ΔPI is stored. Accordingly, by performing a simple process utilizing a mechanism of generation of the initial learning amount that converges into a constant amount through repeated experience of the learning, PS learning region correction amount ΔPL can be obtained with high accuracy.

(6) AT oil temperature sensor 5 that detects a temperature of working oil in the automatic transmission is provided, and the learning correction amount setting and storing means (FIG. 3) includes a plurality of memories RAM1, RAM2 and RAM3 separately storing learning region correction amount ΔPL in each of AT oil temperature ranges based on the temperature of the working oil which is detected, and one memory RAMI that stores the initial learning amount (PS initial learning amount ΔPI) when the temperature of the working oil which is detected falls in an ordinary temperature range. The engagement pressure command value learning correction means (FIG. 4) calculates final engagement pressure command value PO* on the basis of time-dependent deterioration correction amount ΔPEO on which the detected AT oil temperature ATF is reflected, and oil temperature-dependent PS initial learning amount ΔPI(ATF) on which the detected AT oil temperature is reflected, when the learning correction of engagement pressure command value PO is performed, as shown in steps S409 to step S411 in FIG. 4. As a result, although the RAM capacity is minimized, final engagement pressure command value PO* which can correspond to variation in AT oil temperature ATF (that is, variation in viscosity of the working oil) can be calculated with high accuracy.

(7) The solenoid valve is constructed from normal-high linear solenoid valve 2 having an input and output characteristic in which when solenoid current $I_{SOL}$ that is applied to solenoid 202 is zero, the solenoid valve is closed so that pilot pressure $P_p$ acts as solenoid pressure $P_{SOL}$, and when solenoid current $I_{SOL}$ is increased, an opening degree of the solenoid valve becomes large to allow an increase in drain oil amount and cause drop of solenoid pressure $P_{SOL}$. Therefore, when normal-high linear solenoid valve 2 is placed in the closed position, the working oil is prevented from flowing through attraction portion A inside of the solenoid valve so that attraction portion A tends to suffer from adhesion of magnetic contaminant C as compared to a normal-low solenoid valve. However, according to the present invention, even in the automatic transmission employing normal-high linear solenoid valve 2, it is possible to effectively eliminate influence of the time-dependent deterioration due to the adhesion of magnetic contaminant C to attraction portion A by the control measure using the control software system in this embodiment.

The present invention is not limited to the embodiment described above and various modifications can be made without departing from the scope of the present invention.

In the above embodiment, time-dependent deterioration characteristic data 100 is set, which indicates a maximum drop characteristic of the time-dependent deterioration characteristic value on the basis of a characteristic of decrease in solenoid pressure $P_{SOL}$ which is caused due to adhesion of magnetic contaminant C to attraction portion A of normal-high linear solenoid valve 2. However, except for time-dependent deterioration characteristic data 100 based on the decrease in solenoid pressure $P_{SOL}$ due to the adhesion of magnetic contaminant C, it is possible to additionally set a time-dependent deterioration characteristic data based on a characteristic of reduction of friction coefficient in a clutch plate, a brake plate, a brake band or the like. Further, it is possible to additionally set a time-dependent deterioration characteristic data based on a characteristic of other factors of the posterior time-dependent deterioration in the control mechanism.

In the above embodiment, the learning correction amount is obtained by the piston stroke learning in which piston stroke time $T_r$ in the shift transition is conformed to target time $T_t$. However, the learning correction amount can be obtained by the learning of a rate of change in gear ratio in which a rate of change in gear ratio in an inertia phase is conformed to a target rate of change in gear ratio. Further, the learning correction amount can be obtained using both of piston stroke learning and the learning of a rate of change in gear ratio.

Although the control system for an automatic transmission according to the present invention is applied to the automatic transmission equipped with normal-high linear solenoid valve 2 in the above embodiment, the control system of the present invention can also be applied to an automatic transmission equipped with a solenoid valve of the other type, such as a normal-low solenoid valve, that may be influenced by deterioration due to magnetic contaminant.

Further, the control system for an automatic transmission according to the present invention is not limited to the above embodiment applied to the automatic transmission installed into an engine vehicle in which input torque can be estimated by throttle opening TVO. The control system for an automatic transmission according to the present invention can also be applied to an automatic transmission that is installed in other types of vehicles such as a hybrid vehicle including an engine and a drive motor in a power unit, and an electric vehicle including a drive motor in a power unit.

The entire contents of Japanese Patent Application No. 2008-062929 filed on Mar. 12, 2008 are hereby incorporated by reference.

Although the present invention has been described above by reference to a certain embodiment of the present invention, the present invention is not limited to the embodiment described above. Modifications and variations of the embodiment described above will occur to those skilled in the art in light of the above teachings. The scope of the present invention is defined with reference to the following claims.

What is claimed is:

1. A control system for an automatic transmission, comprising:
   a friction engagement element that is engaged or released upon shifting of the automatic transmission;
   a solenoid valve that produces a solenoid pressure by application of a solenoid current;
   an engagement pressure control valve that receives the solenoid pressure as an operating signal pressure and controls an engagement pressure to be supplied to the friction engagement element according to the solenoid pressure;
   a learning correction amount setting and storing means for setting and storing a learning correction amount that is obtained when shifting of the automatic transmission is experienced; and
   an engagement pressure command value learning correction means for correcting an engagement pressure command value that is calculated according to a shifting of the automatic transmission transition state by using the learning correction amount,
   wherein the learning correction amount is divided into an initial learning amount that has no dependence upon the engagement pressure command value and converges into a constant amount owing to individual variation, and a time-dependent deterioration amount that has dependence upon the engagement pressure command value and varies owing to posterior deterioration of a control mechanism,
   wherein the learning correction amount setting and storing means sets and stores a learning region correction amount and an initial learning amount which are obtained by a learning control in a learning region that is a limited input torque region, and
   wherein the engagement pressure command value learning correction means determines a time-dependent deterioration correction amount according to the engagement pressure command value and a degree of progress of time-dependent deterioration that is indicated by a difference between the learning region correction amount and the initial learning amount, and calculates a final engagement pressure command value as the learning correction amount by adding the initial learning amount at the time of correction to the time-dependent deterioration correction amount.

2. The control system for an automatic transmission as claimed in claim 1, wherein the engagement pressure command value learning correction means includes a time-dependent deterioration characteristic data that indicates a relationship between the engagement pressure command value and a time-dependent deterioration characteristic value that indicates a maximum hydraulic drop value with respect to the engagement pressure command value due to the posterior deterioration of the control mechanism, and
   wherein the engagement pressure command value learning correction means determines a learning region time-dependent deterioration amount by subtracting the initial learning amount from the learning region correction amount which are set and stored in the learning correction amount setting and storing means,
   the engagement pressure command value learning correction means determines a learning region time-dependent deterioration characteristic value by using the time-dependent deterioration characteristic data and a learning region engagement pressure,
   the engagement pressure command value learning correction means calculates a deterioration rate that indicates the degree of progress of time-dependent deterioration, by dividing the learning region time-dependent deterioration amount by the learning region time-dependent deterioration characteristic value,
   the engagement pressure command value learning correction means determines the time-dependent deterioration characteristic value by using the engagement pressure command value and the time-dependent deterioration characteristic data, and the engagement pressure command value learning correction means determines the time-dependent deterioration correction amount by multiplying the deterioration rate by the time-dependent deterioration characteristic value.

3. The control system for an automatic transmission as claimed in claim 2, wherein the engagement pressure command value learning correction means sets a maximum drop characteristic as the time-dependent deterioration characteristic data in which the time-dependent deterioration characteristic value varies in proportion to the engagement pressure command value in a region in which the engagement pressure command value is not more than a predetermined value, and the time-dependent deterioration characteristic value is constant in a region in which the engagement pressure command value is more than the predetermined value, on a basis of a characteristic of the solenoid pressure which is dropped with respect to the solenoid current due to gradual reduction of a magnetic gap at a magnetic attraction portion of the solenoid valve which is caused by a magnetic contaminant adhered to the magnetic attraction portion of the solenoid valve.

4. The control system for an automatic transmission as claimed in claim 1, wherein the learning correction amount setting and storing means updates and stores a correction amount as a piston stroke learning region correction amount which is increased when the shifting of the automatic transmission is conducted in a low input torque region in which a throttle opening is not more than a predetermined degree and a piston stroke time of the friction engagement element from start of the shifting of the automatic transmission to start of an inertia phase is longer than a target time, and decreased when the shifting of the automatic transmission is conducted in the low input torque region and the piston stroke time is shorter than the target time.

5. The control system for an automatic transmission as claimed in claim 4, wherein the learning correction amount setting and storing means sets and stores a value of the piston stroke learning region correction amount which is stabilized by experiencing a predetermined frequency of learning from start of the learning, as a piston stroke initial learning amount, and maintains the piston stroke initial learning amount once the piston stroke initial learning amount is stored.

6. The control system for an automatic transmission as claimed in claim 1, further comprising an oil temperature detecting means for detecting a temperature of working oil in the automatic transmission, wherein the learning correction amount setting and storing means comprises a plurality of memories separately storing the learning region correction amount in each of oil temperature ranges based on the temperature of working oil in the automatic transmission which is detected, and one memory that stores the initial learning amount when the temperature of working oil in the automatic transmission which is detected falls in an ordinary temperature range, and wherein the engagement pressure command value learning correction means calculates the final engagement pressure command value on the basis of the time-dependent deterioration correction amount on which the detected temperature of working oil in the automatic transmission is reflected, and the initial learning amount on which the detected temperature of working oil in the automatic transmission is reflected, when the learning correction of the engagement pressure command value is performed.

7. The control system for an automatic transmission as claimed in claim 1, wherein the solenoid valve is a normal-high linear solenoid valve that has an input and output characteristic in which when the solenoid current that is applied to a solenoid is zero, the solenoid valve is closed and a pilot pressure acts as the solenoid pressure, and when the solenoid current is increased, an opening degree of the solenoid valve becomes large to allow an increase in drain oil amount and cause drop of the solenoid pressure.

8. A control method for controlling an automatic transmission, the automatic transmission including a friction engagement element that is engaged or released upon shifting of the automatic transmission, a solenoid valve that produces a solenoid pressure by application of a solenoid current, an engagement pressure control valve that receives the solenoid pressure as an operating signal pressure and controls an engagement pressure to be supplied to the friction engagement element according to the solenoid pressure, and an electronic control unit for controlling the solenoid current which includes a learning correction amount setting and storing section for setting and storing a learning correction amount that is obtained when shifting of the automatic transmission is experienced and an engagement pressure command value learning correction section for correcting an engagement pressure command value that is calculated according to a shifting of the automatic transmission transition state by using the learning correction amount, wherein the learning correction amount is divided into an initial learning amount that has no dependence upon the engagement pressure command value and converges into a constant amount owing to individual variation, and a time-dependent deterioration amount that has dependence upon the engagement pressure command value and varies owing to posterior deterioration of a control mechanism, the control method comprising the steps of:

setting and storing a learning region correction amount and an initial learning amount which are obtained by a learning control in a learning region that is a limited input torque region;

determining a time-dependent deterioration correction amount according to the engagement pressure command value and a degree of progress of time-dependent deterioration that is indicated by a difference between the learning region correction amount and the initial learning amount; and calculating a final engagement pressure command value as the learning correction amount by adding the initial learning amount at the time of correction to the time-dependent deterioration correction amount.

9. The control method for controlling an automatic transmission as claimed in claim 8, wherein the engagement pressure command value learning correction section includes a time-dependent deterioration characteristic data that indicates a relationship between the engagement pressure command value and a time-dependent deterioration characteristic value that indicates a maximum hydraulic drop value with respect to the engagement pressure command value due to the posterior deterioration of the control mechanism, the control method further comprising the steps of:

determining a learning region time-dependent deterioration amount by subtracting the initial learning amount from the learning region correction amount which are set and stored in the learning correction amount setting and storing section;

determining a learning region time-dependent deterioration characteristic value by using the time-dependent deterioration characteristic data and a learning region engagement pressure;

calculating a deterioration rate that indicates the degree of progress of time-dependent deterioration, by dividing the learning region time-dependent deterioration amount by the learning region time-dependent deterioration characteristic value;

determining a time-dependent deterioration characteristic value by using the engagement pressure command value and the time-dependent deterioration characteristic data; and determining the time-dependent deterioration correction amount by multiplying the deterioration rate by the time-dependent deterioration characteristic value.

10. The control method for controlling an automatic transmission as claimed in claim 9, further comprising the step of setting a maximum drop characteristic as the time-dependent deterioration characteristic data in which the time-dependent deterioration characteristic value varies in proportion to the engagement pressure command value in a region in which the engagement pressure command value is not more than a predetermined value, and the time-dependent deterioration characteristic value is constant in a region in which the engagement pressure command value is more than the predetermined value, on a basis of a characteristic of the solenoid pressure which is dropped with respect to the solenoid current due to gradual reduction of a magnetic gap at a magnetic attraction portion of the solenoid valve which is caused by a magnetic contaminant adhered to the magnetic attraction portion of the solenoid valve.

11. The control method for controlling an automatic transmission as claimed in claim 8, further comprising the step of updating and storing a correction amount as a piston stroke learning region correction amount which is increased when the shifting of the automatic transmission is conducted in a low input torque region in which a throttle opening is not more than a predetermined degree and a piston stroke time of the friction engagement element from start of the shifting of the automatic transmission to start of an inertia phase is longer than a target time, and decreased when the shifting of the automatic transmission is conducted in the low input torque region and the piston stroke time is shorter than the target time.

12. The control method for controlling an automatic transmission as claimed in claim 11, further comprising the steps of:
    setting and storing a value of the piston stroke learning region correction amount which is stabilized by experiencing a predetermined frequency of learning from start of the learning, as a piston stroke initial learning amount; and maintaining the piston stroke initial learning amount once the piston stroke initial learning amount is stored.

13. The control method for controlling an automatic transmission as claimed in claim 8, wherein the learning correction amount setting and storing section includes a plurality of memories separately storing the learning region correction amount in each of oil temperature ranges based on the temperature of working oil in the automatic transmission, and one memory that stores the initial learning amount when the temperature of working oil in the automatic transmission falls in an ordinary temperature range, the control method further comprising the steps of:
    detecting the temperature of working oil in the automatic transmission; and
    calculating the final engagement pressure command value on the basis of the time-dependent deterioration correction amount on which the detected temperature of working oil in the automatic transmission is reflected, and the initial learning amount on which the detected temperature of working oil in the automatic transmission is reflected, when the learning correction of the engagement pressure command value is performed.

14. The control method for controlling an automatic transmission as claimed in claim 8, wherein the solenoid valve is a normal-high linear solenoid valve that has an input and output characteristic in which when the solenoid current that is applied to a solenoid is zero, the solenoid valve is closed and a pilot pressure acts as the solenoid pressure, and when the solenoid current is increased, an opening degree of the solenoid valve becomes large to allow an increase in drain oil amount and cause drop of the solenoid pressure.

* * * * *